US009467545B1

(12) United States Patent
Agranov

(10) Patent No.: US 9,467,545 B1
(45) Date of Patent: Oct. 11, 2016

(54) SPECIFICALLY PROGRAMMED COMPUTER-IMPLEMENTED ENGINE SYSTEMS FOR REAL-TIME ON-DEMAND DISCOVERY OF AVAILABLE TIME SLOTS ACROSS PROGRAMMED SCHEDULE OBJECTS AND METHODS OF USE THEREOF

(71) Applicant: GoneBusy, Inc., Brooklyn, NY (US)

(72) Inventor: Alexander V. Agranov, Brooklyn, NY (US)

(73) Assignee: GoneBusy, Inc., Brooklyn, NY (US)

(*) Notice: Subject to any disclaimer, the term of this patent is extended or adjusted under 35 U.S.C. 154(b) by 0 days.

(21) Appl. No.: 14/937,279

(22) Filed: Nov. 10, 2015

Related U.S. Application Data

(60) Provisional application No. 62/077,751, filed on Nov. 10, 2014.

(51) Int. Cl.
| | |
|---|---|
| *H04M 1/00* | (2006.01) |
| *H04M 1/725* | (2006.01) |
| *G06Q 10/10* | (2012.01) |
| *G06F 3/0484* | (2013.01) |
| *G06F 3/0482* | (2013.01) |
| *G06F 17/30* | (2006.01) |
| *G06F 17/22* | (2006.01) |
| *G06Q 10/06* | (2012.01) |

(52) U.S. Cl.
CPC ............ *H04M 1/725* (2013.01); *G06F 3/0482* (2013.01); *G06F 3/0484* (2013.01); *G06F 17/22* (2013.01); *G06F 17/30893* (2013.01); *G06Q 10/063* (2013.01); *G06Q 10/1095* (2013.01); *H04M 2242/15* (2013.01)

(58) Field of Classification Search
None
See application file for complete search history.

(56) References Cited

U.S. PATENT DOCUMENTS

| | | | | |
|---|---|---|---|---|
| 4,626,836 A | * | 12/1986 | Curtis ................. | G06Q 10/109 283/67 |
| 5,070,470 A | * | 12/1991 | Scully ................. | G06Q 10/109 708/112 |
| 6,388,772 B1 | * | 5/2002 | Williams ............. | G06Q 10/109 358/400 |
| 6,988,128 B1 | * | 1/2006 | Alexander ........... | G06Q 10/109 709/206 |
| 7,082,402 B2 | * | 7/2006 | Conmy ................. | G06F 17/211 705/7.13 |

(Continued)

OTHER PUBLICATIONS

Leslie A Perlow. (1998). Boundary control: The social ordering of work and family time in a high-tech corporation. Administrative Science Quarterly, 43(2), 328-357.*

(Continued)

*Primary Examiner* — Gurkanwaljit Singh
(74) *Attorney, Agent, or Firm* — Greenberg Traurig, LLP

(57) ABSTRACT

In some embodiments, the present invention provides for a computer-implemented method, including at least the following steps to be performed by a specifically programmed computer processor of a schedule management computer system: electronically causing to display a specialized schedule GUI; where the specialized schedule GUI is configured to allow each user to: define a programmed schedule object, including a plurality of availability time periods (TimeWindows); each having TimeWindow parameters, and identifying when a time period is available or unavailable for booking; where the TimeWindow parameters include: a start date, a start time, an end time, at least one day of a week, and a period type; electronically and in real-time, generating a bitmask of days in a week for each TimeWindow of the TimeWindows; electronically and in real-time, storing schedule objects associated with the users in a specifically dedicated database.

18 Claims, 17 Drawing Sheets

(56) References Cited

U.S. PATENT DOCUMENTS

| | | | |
|---|---|---|---|
| 8,036,987 B1* | 10/2011 | Grbac | G06Q 20/102 705/40 |
| 2001/0014866 A1* | 8/2001 | Conmy | G06F 17/211 705/7.19 |
| 2003/0004773 A1* | 1/2003 | Clark | G06Q 10/109 705/7.19 |
| 2003/0050038 A1* | 3/2003 | Haave | B60R 25/102 455/404.1 |
| 2004/0039626 A1* | 2/2004 | Voorhees | G06Q 10/02 705/7.19 |
| 2004/0066300 A1* | 4/2004 | Dorenbosch | G04C 10/04 340/636.1 |
| 2008/0098313 A1* | 4/2008 | Pollack | G06F 3/048 715/753 |
| 2010/0070930 A1* | 3/2010 | Thibault | G06Q 10/10 715/854 |
| 2010/0094680 A1* | 4/2010 | Ellis | G06Q 10/02 705/7.18 |
| 2010/0267359 A1* | 10/2010 | Gyllensvaan | H04W 76/007 455/404.1 |
| 2012/0101952 A1* | 4/2012 | Raleigh | G06Q 30/016 705/304 |
| 2012/0303439 A1* | 11/2012 | Flitcroft | G06Q 10/107 705/14.36 |
| 2013/0204669 A1* | 8/2013 | Percy | G06Q 30/0205 705/7.34 |
| 2013/0237204 A1* | 9/2013 | Buck | H04M 1/72569 455/418 |

OTHER PUBLICATIONS

Maximizing Success in Lean Project Management Leadership (Presentation Supporting Paper) Travis Huber. IIE Annual Conference. Proceedings. Norcross: 2002. p. 1 (10 pages).*

Christian Timpe. (2002). Solving planning and scheduling problems with combined integer and constraint programming*. OR Spectrum, 24(4), 431-448.*

* cited by examiner

Example 1
General Schedule Representation
and Queries

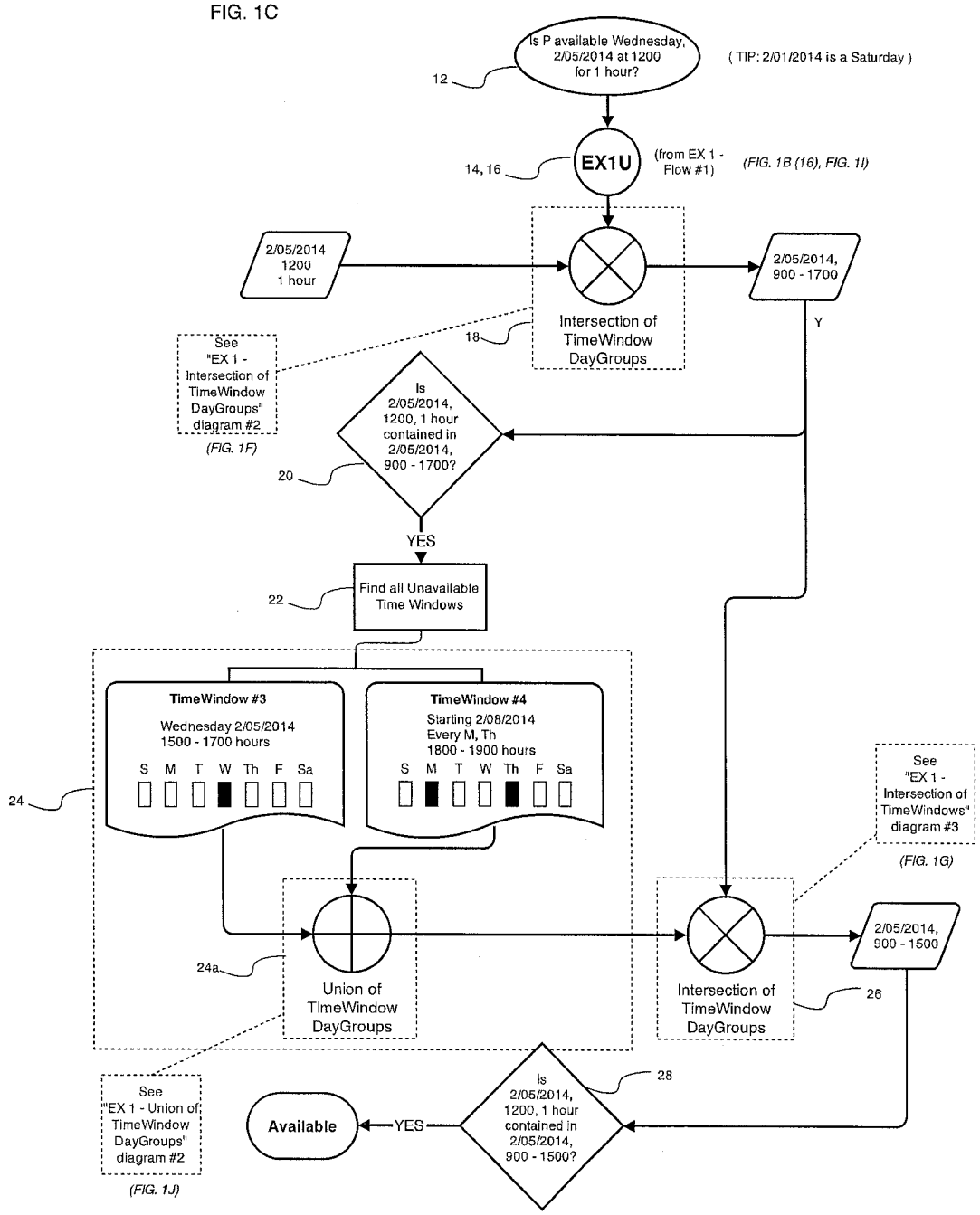

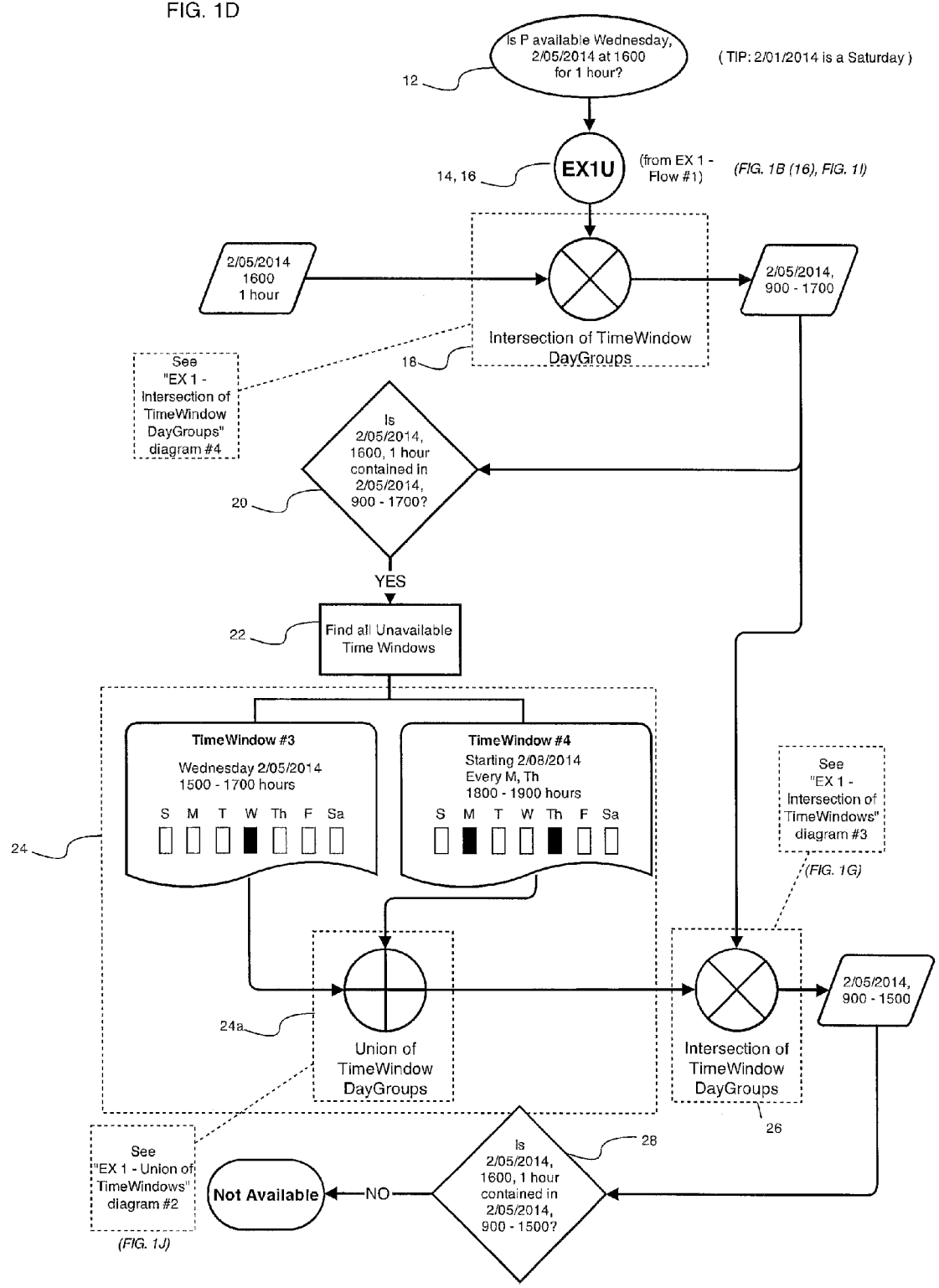

EX 1 - Intersection of TimeWindow DayGroups
Diagram #1

EX 1 - Intersection of TimeWindow DayGroups
Diagram #2

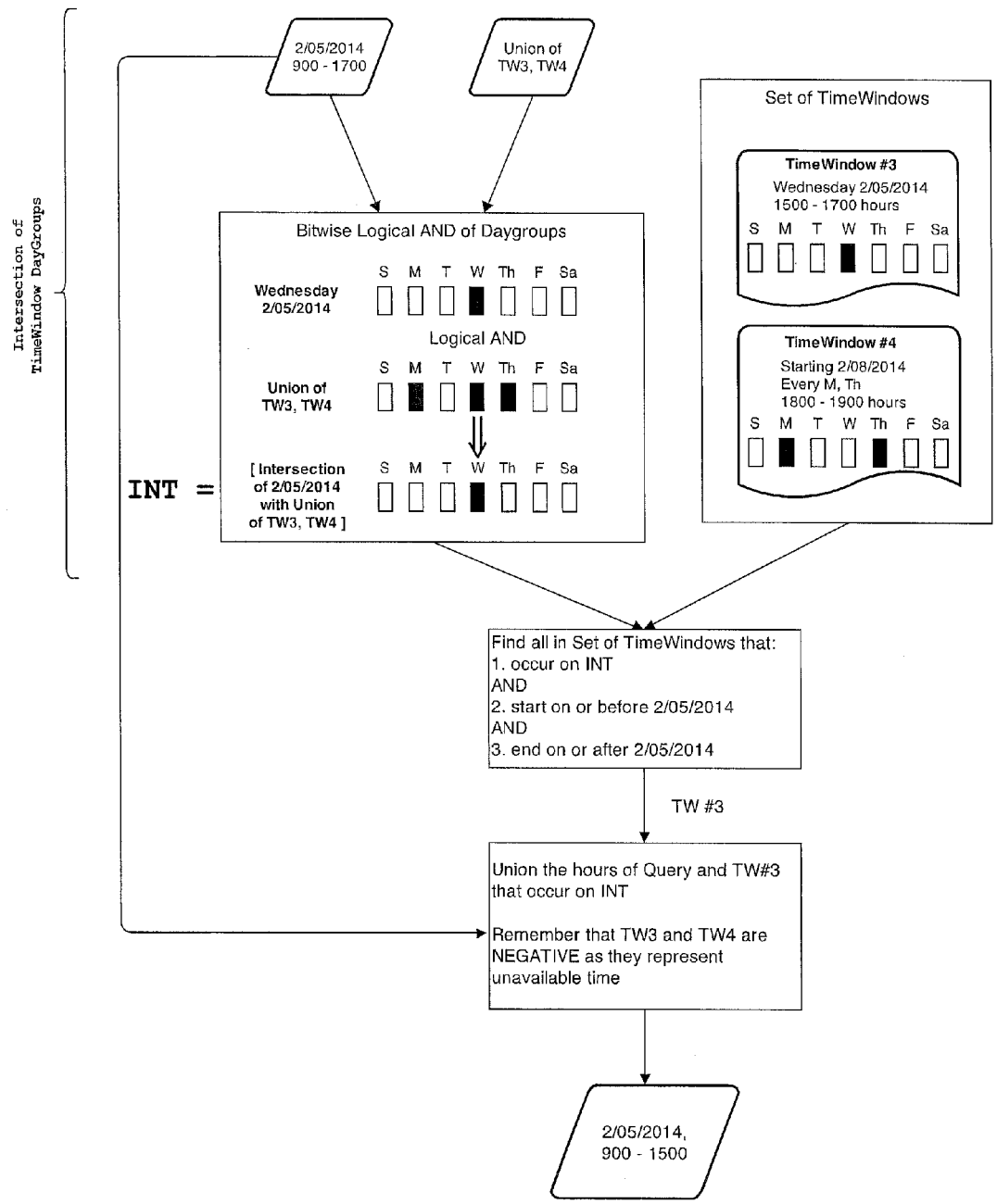

EX 1 - Intersection of TimeWindows
Diagram #4

FIG. 2A

Example 2
Many Availabilities
version 1

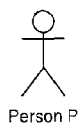
Person P

Schedule S
( TIP: 2/01/2014 is a Saturday )

Advertised Time

TimeWindow #1
Start Date: Starting 2/01/2014
Frequency: Every Sunday
Start/End Time: 1200 - 1700 hours S  M  T  W  Th  F  Sa
Daygroup: ■ ☐ ☐ ☐ ☐ ☐ ☐

TimeWindow #2
Start Date: Starting 2/01/2014
Frequency: Every Saturday
Start/End Time: 1600 - 2200 hours S  M  T  W  Th  F  Sa
Daygroup: ☐ ☐ ☐ ☐ ☐ ☐ ■

TimeWindow #3
Start Date: Starting 2/01/2014
Frequency: Every Monday
Start/End Time: 900 - 1900 hours S  M  T  W  Th  F  Sa
Daygroup: ☐ ■ ☐ ☐ ☐ ☐ ☐

TimeWindow #4
Start Date: Starting 2/01/2014
Frequency: Every Friday
Start/End Time: 900 - 1700 hours S  M  T  W  Th  F  Sa
Daygroup: ☐ ☐ ☐ ☐ ☐ ■ ☐

Key for Daygroup:

- Daygroup is a bit string representation of the days of the week that could have availability, with Sunday being the least significant bit.
- A black square indicates this position bit has a value of 1, or "ON"; likewise, a white square indicates a value of 0, or "OFF".

Sample Query

1. Is P available Wednesday, 2/5/2014 at 1200? - EX 2 - Flow Chart #1

Example 3
Many Unavailabilities

Sample Queries

1. Is P available Wednesday, 2/5/2014 at 1200? - EX 2 - Flow Chart #1

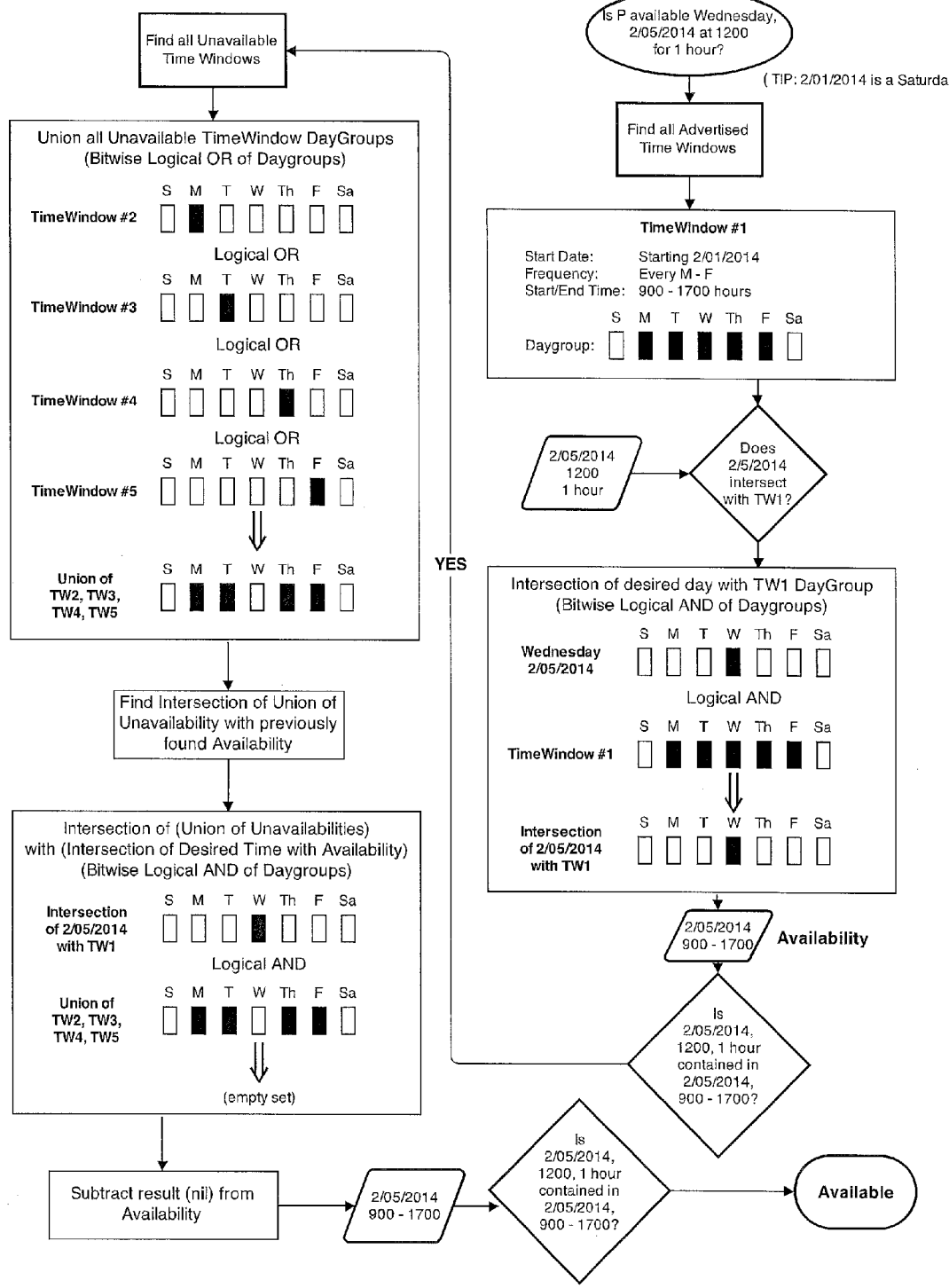
FIG. 3B — EX 3 - Flow Chart #1

FIG. 4

Data Representation

Example Schedules

|  | Sunday | Monday | Tuesday | Wednesday | Thursday | Friday | Saturday |

Availability 1
Availability 2
Unavailability 1
Unavailability 2

Example Availability UI for Customer

Wednesday  Thursday  Friday (Note how Friday is the Availability for Friday MINUS the Unavailability for Friday)

SPECIFICALLY PROGRAMMED COMPUTER-IMPLEMENTED ENGINE SYSTEMS FOR REAL-TIME ON-DEMAND DISCOVERY OF AVAILABLE TIME SLOTS ACROSS PROGRAMMED SCHEDULE OBJECTS AND METHODS OF USE THEREOF

RELATED APPLICATIONS

This application claims the priority of U.S. provisional patent application No. 62/077,751; filed Nov. 10, 2014; entitled "SYSTEM AND METHOD FOR PERMITTING A USER TO QUERY A LARGE NUMBER OF STORED SCHEDULES FOR A LIMITED NUMBER OF POTENTIALLY AVAILABLE TIME SLOTS," which is incorporated herein by reference in its entirety for all purposes.

FIELD OF INVENTION

In some embodiments, the present invention is related to specifically programmed computer-implemented engine systems for real-time on-demand discovery of available time slots across programmed schedule objects and methods of use thereof.

BACKGROUND OF THE INVENTION

Interaction with schedules covering large scale data sets is ubiquitous. Activities that require specific systems and processes to interact with such schedules include but are not limited to, appointments (e.g., medical, dental, spa, professional, training, etc.), bookings (e.g., time slots for space, sport (golf, tennis, squash)), reservations (e.g., hotels), rentals (e.g., car, vacation, equipment), invitations (e.g., business, parties), social gatherings, sports leagues, etc.

SUMMARY OF THE INVENTION

In some embodiments, the present invention provides for a computer-implemented method, including at least the steps of: electronically causing, via a computer network, by at least one specifically programmed computer processor of a schedule management computer system executing software to perform the method, to display a first specialized schedule graphical user interface (a first specialized schedule GUI) on a screen of each computing device associated with each user of a plurality of users; where the first specialized schedule GUI is configured to allow each user to: i) define at least one programmed schedule object, including a plurality of availability time periods (a plurality of TimeWindows), and ii) associate at least one programmed schedule object with at least one of: 1) at least one user, 2) at least one resource, and 3) at least one service; where each TimeWindow is: i) defined by a plurality of TimeWindow parameters, and ii) configured to identify whether a corresponding time period is available for booking or unavailable for booking; where the plurality of TimeWindow parameters include: i) at least one first TimeWindow parameter, identifying a start date for the corresponding time period, ii) at least one second TimeWindow parameter, identifying a start time for the corresponding time period, iii) at least one third TimeWindow parameter, identifying an end time for the corresponding time period, iv) at least one fourth TimeWindow parameter, identifying at least one day of a week associated with the corresponding time period, and v) at least one fifth TimeWindow parameter, identifying a period type of the corresponding time period; electronically and in real-time, generating, by the at least one specifically programmed computer processor, based, at least in part, on the at least one fourth TimeWindow parameter, a first bitmask of days in a week for the corresponding time period of each TimeWindow of the plurality of TimeWindows; electronically and in real-time, storing, by the at least one specifically programmed computer processor, a plurality of schedule objects associated with the plurality of users in at least one specifically dedicated database; electronically causing, via the computer network, by the at least one specifically programmed computer processor, to display a second specialized schedule graphical user interface (a second specialized schedule GUI) on a screen of a computing device associated with a particular user, where the second specialized schedule GUI is configured to allow each user to submit an electronic query seeking to determine when a particular time period associated with at least one user is available for booking or unavailable for booking; electronically receiving, via the computer network, by the at least one specifically programmed computer processor, the electronic query of the particular user; electronically and in real-time, determining, by the at least one specifically programmed computer processor, based on the electronic query of the particular user, a set of TimeWindows selected from the plurality of schedule objects related to at least one of 1) the at least one user, 2) the at least one resource, and 3) the at least one service; electronically and in real-time, determining, by the at least one specifically programmed computer processor, based on the electronic query of the particular user, a set of TimeWindows selected from the plurality of schedule objects related to at least one of 1) the at least one user, 2) the at least one resource, and 3) the at least one service; electronically and in real-time, generating, by the at least one specifically programmed computer processor, a union structure of the set of TimeWindows; electronically and in real-time, determining, by the at least one specifically programmed computer processor, based on the first bitmask associated with each TimeWindow of the set of TimeWindows, a second bitmask corresponding to the at least one union; electronically and in real-time, determining, by the at least one specifically programmed computer processor, an intersection structure between the union and the electronic query of the particular user to identify at least one matched day of the week between the at least one union and the particular time period identified in the electronic query of the particular user; electronically and in real-time, determining, by the at least one specifically programmed computer processor, when the at least one matched day of the week includes the particular time period identified in the electronic query of the particular user, based, at least in part, on: 1) the at least one second TimeWindow parameter of a particular TimeWindow associated with the at least one matched day of the week; 2) the at least one third TimeWindow parameter of the particular TimeWindow associated with the at least one matched day of the week; 3) the at least one second TimeWindow parameter of the particular time period identified in the electronic query of the particular user; and 4) the at least one third TimeWindow parameter of the particular time period identified in the electronic query of the particular user; and electronically and in real-time, performing, by the at least one specifically programmed computer processor, one of: i) booking the particular time period for the particular user when the at least one matched day of the week includes the particular time period identified in the electronic query of the particular user; and ii) generating an indication identifying that the particular time period is unavailable for booking when the at least one matched day of the week excludes the particular time period identified in the electronic query of the particular user.

In some embodiments, the exemplary method of the present invention further includes at least: electronically and in real-time, storing, by the at least one specifically programmed computer processor, the union structure and the intersection structure in the at least one specifically dedicated database.

In some embodiments, the plurality of parameters further include at least one sixth parameter, identifying an end date for the corresponding time period. In some embodiments, the period type of the corresponding time period is selected from the group consisting of: once, daily, weekly, monthly, quarterly, and yearly. In some embodiments, the plurality of parameters further include at least one seventh parameter, identifying a particular date or a particular day which is within the corresponding time period having the period type of monthly or yearly. In some embodiments, the plurality of parameters further include at least one eighth parameter, identifying a frequency of the corresponding time period. In some embodiments, the plurality of parameters further include at least one ninth parameter, identifying an interval for the frequency of the corresponding time period. In some embodiments, the union structure is based on a logical OR operation with the set of TimeWindows. In some embodiments, the intersection structure is based on a logical AND operation.

In some embodiments, the present invention provides for a specifically programmed schedule management computer system, including at least: at least one specialized computer machine, including: a non-transient memory, electronically storing particular computer executable program code; and at least one computer processor which, when executing the particular program code, becomes a specifically programmed computer processor of the specifically programmed schedule management computer system that is configured to concurrently perform at least the following operations: electronically causing, via a computer network, to display a first specialized schedule graphical user interface (a first specialized schedule GUI) on a screen of each computing device associated with each user of a plurality of users; where the first specialized schedule GUI is configured to allow each user to: i) define at least one programmed schedule object, including a plurality of availability time periods (a plurality of TimeWindows), and ii) associate at least one programmed schedule object with at least one of: 1) at least one user, 2) at least one resource, and 3) at least one service; where each TimeWindow is: i) defined by a plurality of TimeWindow parameters, and ii) configured to identify whether a corresponding time period is available for booking or unavailable for booking; where the plurality of TimeWindow parameters include: i) at least one first TimeWindow parameter, identifying a start date for the corresponding time period, ii) at least one second TimeWindow parameter, identifying a start time for the corresponding time period, iii) at least one third TimeWindow parameter, identifying an end time for the corresponding time period, iv) at least one fourth TimeWindow parameter, identifying at least one day of a week associated with the corresponding time period, and v) at least one fifth TimeWindow parameter, identifying a period type of the corresponding time period; electronically and in real-time, generating, based, at least in part, on the at least one fourth TimeWindow parameter, a first bitmask of days in a week for the corresponding time period of each TimeWindow of the plurality of TimeWindows; electronically and in real-time, storing a plurality of schedule objects associated with the plurality of users in at least one specifically dedicated database; electronically causing, via the computer network, to display a second specialized schedule graphical user interface (a second specialized schedule GUI) on a screen of a computing device associated with a particular user, where the second specialized schedule GUI is configured to allow each user to submit an electronic query seeking to determine when a particular time period associated with at least one user is available for booking or unavailable for booking; electronically receiving, via the computer network, the electronic query of the particular user; electronically and in real-time, determining, based on the electronic query of the particular user, a set of TimeWindows selected from the plurality of schedule objects related to at least one of 1) the at least one user, 2) the at least one resource, and 3) the at least one service; electronically and in real-time, determining, based on the electronic query of the particular user, a set of TimeWindows selected from the plurality of schedule objects related to at least one of 1) the at least one user, 2) the at least one resource, and 3) the at least one service; electronically and in real-time, generating a union structure of the set of TimeWindows; electronically and in real-time, determining, based on the first bitmask associated with each TimeWindow of the set of TimeWindows, a second bitmask corresponding to the at least one union; electronically and in real-time, determining an intersection structure between the union and the electronic query of the particular user to identify at least one matched day of the week between the at least one union and the particular time period identified in the electronic query of the particular user; electronically and in real-time, determining when the at least one matched day of the week includes the particular time period identified in the electronic query of the particular user, based, at least in part, on: 1) the at least one second TimeWindow parameter of a particular TimeWindow associated with the at least one matched day of the week; 2) the at least one third TimeWindow parameter of the particular TimeWindow associated with the at least one matched day of the week; 3) the at least one second TimeWindow parameter of the particular time period identified in the electronic query of the particular user; and 4) the at least one third TimeWindow parameter of the particular time period identified in the electronic query of the particular user; and electronically and in real-time, performing one of: i) booking the particular time period for the particular user when the at least one matched day of the week includes the particular time period identified in the electronic query of the particular user; and ii) generating an indication identifying that the particular time period is unavailable for booking when the at least one matched day of the week excludes the particular time period identified in the electronic query of the particular user.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 1B, 1C and 1D are flow charts showing programmed process flow in accordance with some principles of some embodiments of the present invention;

FIGS. 1E, 1F, 1G, 1H, 1I and 1J are diagrams representative of programmed Union and Intersection software objects that are relied upon in various locations within FIGS. 1B, 1C and 1D;

FIG. 2A is a representation of a software implementation related to a schedule S including an expanded number of bookings.

FIG. 3B is a flow chart showing a programmed process flow representative for a specifically programmed sample query of the schedule S in FIG. 3A;

FIG. 4 is a schematic diagram of software implementation related to example schedules and a sample of a specifically programmed user graphical interface in accordance with some principles of some embodiments of the present invention

DETAILED DESCRIPTION OF THE INVENTION

Figure 1A:
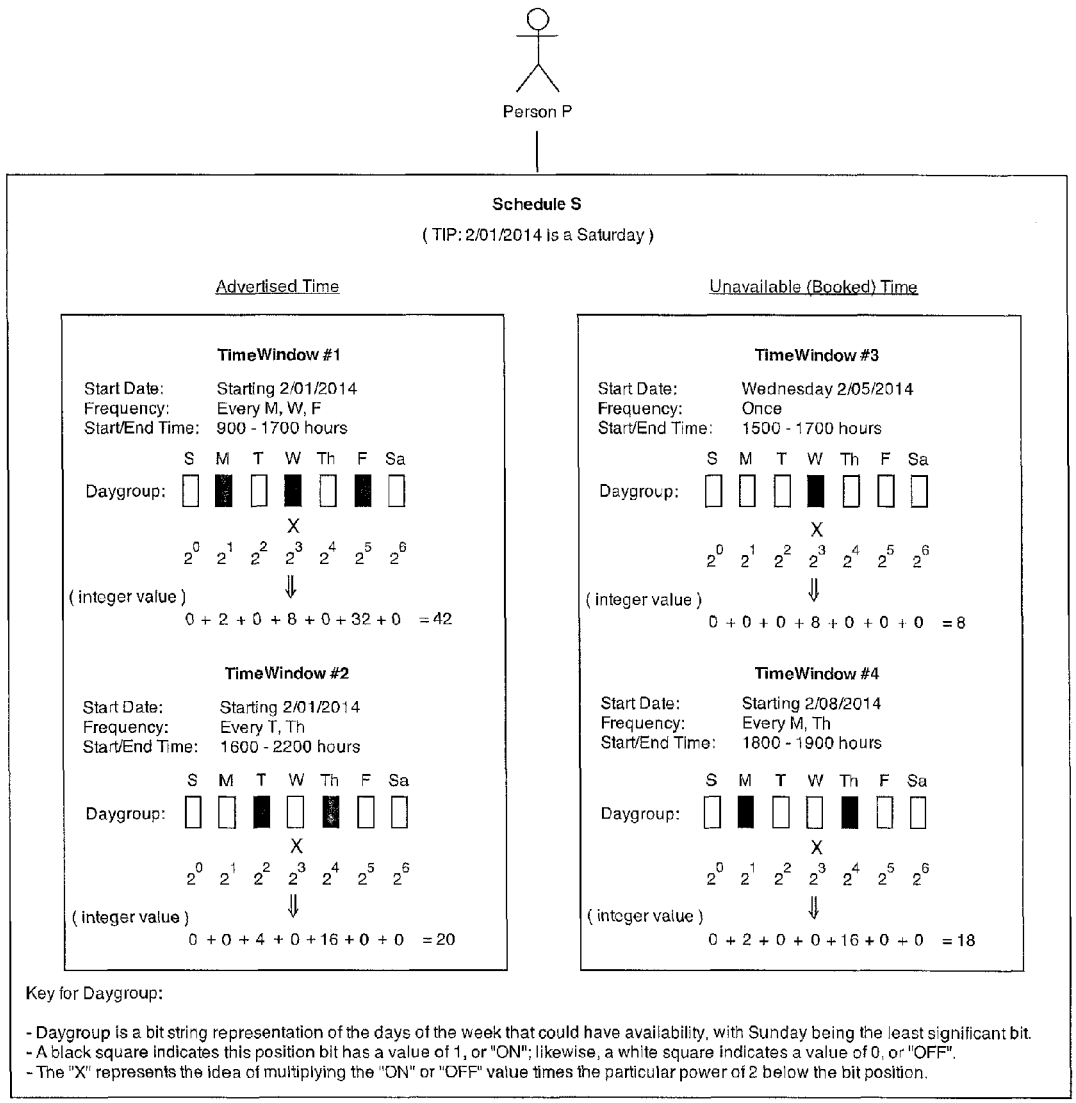
FIG. 1A is a representation of a software implementation related to a schedule S for a person P in accordance with some principles of some embodiments the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds (e.g., 5-10 seconds).

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive electronic systems includes electronic mobile devices (e.g., smartphones, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.).

In some embodiments, an exemplary specifically programmed computer-implemented engine of the present invention operates utilizing software constructs of TimeWindows of available (or unavailable—booked) time (e.g., coded objects) to represent a Schedule (e.g., an electronic calendar). For example, each TimeWindow construct (e.g., programmed object/routine) has a Period feature of a particular type. Then, each Period has a DayGroup property which is a bitmask of days of the week that this Period falls on as explained further therein. In some embodiments, the Periods features can have additional properties that determine if a user is interested in an Interval property to be defined (e.g., every other, every third, etc.) and/or a particular Occurrence to be defined (first, second, third, second from last, etc.)

For example, a particular Schedule could consist of "every Tuesday and Thursday every week, as well as every first Monday of the month" availability data. In some embodiments, the exemplary specifically programmed computer-implemented engine of the present invention transforms this Schedule to represent it with two TimeWindows objects/data constructs:

TimeWindow #1 is a Weekly Period with a DayGroup bitmask of "0010100" (FIG. 1A) (e.g., the right-most digit is Sunday); and TimeWindow #2 is a Monthly Period with a DayGroup bitmask of "0000010" (FIG. 1A) (e.g., the right-most digit is Sunday) along with an Occurrence property is set to "first".

In some embodiments, the exemplary specifically programmed computer-implemented engine of the present invention is configured to have Periods objects to be limited to a particular Day. Then, the exemplary specifically programmed computer-implemented engine of the present invention transforms the Schedule to represent it with TimeWindows objects/data constructs as:

TimeWindow #1 is a Weekly Period falling on a Tuesday only with a DayGroup bitmask of "0000100" (e.g., the right-most digit is always Sunday);

TimeWindow #2 is a Weekly Period falling on a Thursday only with a DayGroup bitmask of "0010000" (e.g., the right-most digit is always Sunday); and TimeWindow #3 is a Monthly Period with a DayGroup bitmask of "0000010" (e.g., the right-most digit is always Sunday) along with an Occurrence property of "first".

So if the exemplary specifically programmed computer-implemented engine of the present invention executes a query for availability on Tuesday, a result could be determined by employing intersection of Tuesday with the union of all TimeWindows (TWs).

In some embodiments, the exemplary specifically programmed computer-implemented engine of the present invention executes a query for availability on Tuesday by avoiding the DayGroup bitmask processing by designating Periods object to only fall on a particular Day, resulting in TimeWindows objects/data constructs represented as:

TimeWindow #1 is a Weekly Period with a Day of Tuesday

TimeWindow #2 is a Weekly Period with a Day of Thursday

TimeWindow #3 is a Monthly Period with a Day of Monday and an Occurrence of "first".

In this case, if the exemplary specifically programmed computer-implemented engine of the present invention executes a query for availability on Tuesday, a result could be determined but would have to rely on exact matching of Tuesday with the Period Day of each TW, rather than employing intersection of Tuesday with the union of all TWs. In some embodiments, the exemplary specifically programmed computer-implemented engine of the present invention is configured to rely on exact matching of requested dates against each TW of a Schedule.

FIG. 1A is a representation of a software implementation (such as programmable datasets) related to an example schedule S for a person P in accordance with some principles of some embodiments of the present invention. In this example, S includes two "time window" sets that each represent attributes (e.g., day(s) of the week, start/end time and start date, etc.) of available time, and two time window sets that each represent attributes of unavailable (booked) time. In some embodiments, the attributes start date and start/end time can be represented as in conventional scheduling systems, e.g., date code and military time. In some embodiments, the days of the week within each time window set are represented as a "daygroup" set. As shown in FIG. 1A, in some embodiments, the daygroup set is a seven-slot bit string representation of the days of the week that could have availability, with Sunday being the least significant bit. In the depicted example a black square indicates that this position bit has a value of "1", or "ON", and a white square indicates a value of "0" or "OFF".

Figure 1B:
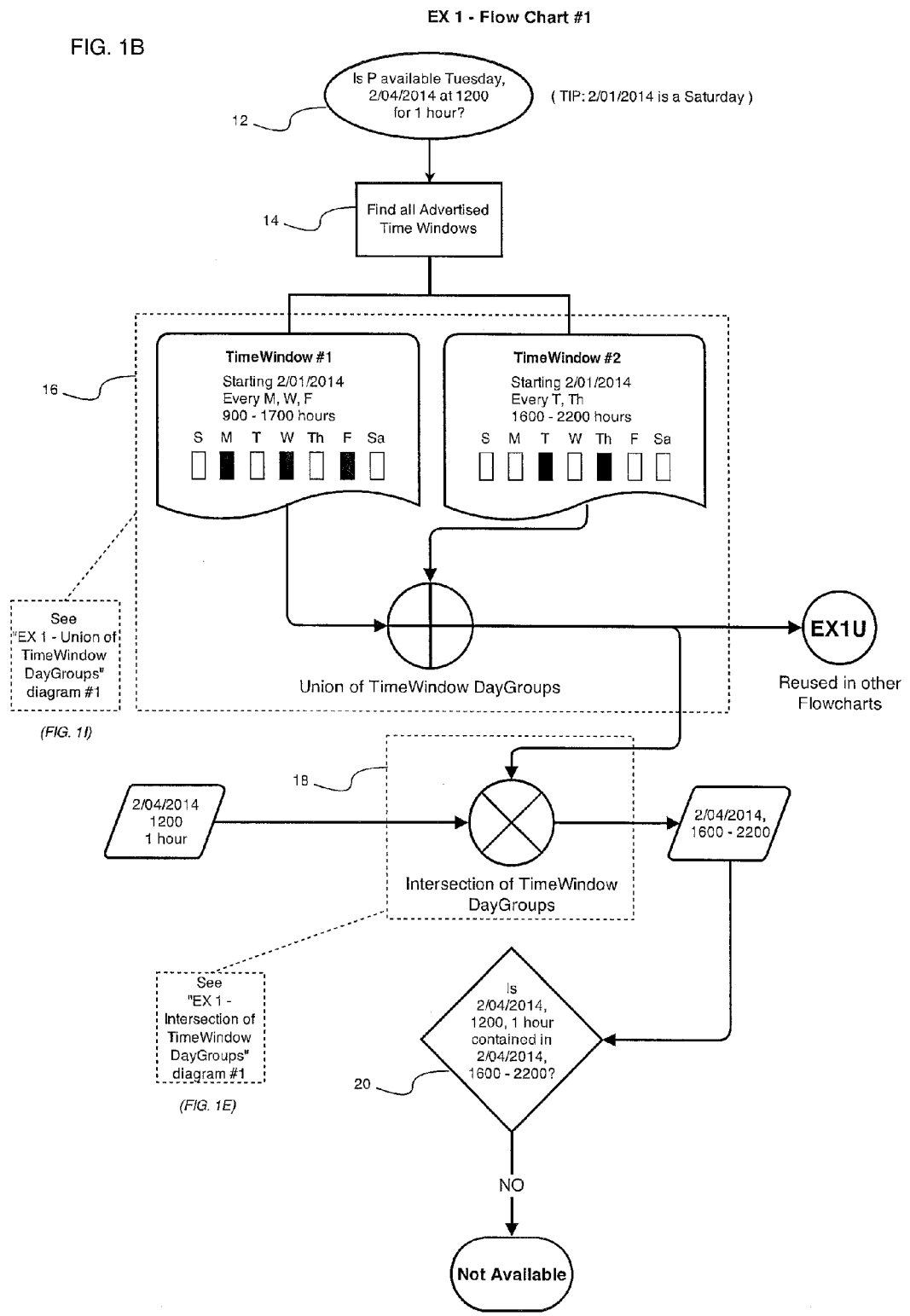

FIGS. 1B, 1C and 1D are flow charts showing sample schematics representative of programmed computer queries for specific day and time slots based on the schedule S represented by time window sets 1, 2, 3 and 4. In addition, FIGS. 1E, 1F, 1G, 1H, 1I and 1J are diagrams representative of bitwise logical OR (union) and AND (intersection) programmed computer operations used in these sample queries.

An illustrative Example of Logical Conjunction (AND)

As used herein, logical conjunction (AND) is a computer-executed operation on two logical values, typically the values of two propositions, that produces a value of true if both of its operands are true. The truth table, Table 1, for p AND q (also written as p ∧ q, Kpq, p & q, or p • q) is as follows:

TABLE 1

Logical Conjunction

| p | q | p ∧ q |
|---|---|---|
| T | T | T |
| T | F | F |
| F | T | F |
| F | F | F |

For example, if both p and q are true, then the conjunction p ∧ q is true. For all other assignments of logical values to p and to q the conjunction p ∧ q is false. It can also be said that if p, then p ∧ q is q, otherwise p ∧ q is p. For example, where p and q are data bits, the syntax for p ∧ q in the Ruby programming language is: p & q.

An illustrative Example of Logical disjunction (OR)

As used herein, logical disjunction (OR) is an operation on two logical values, typically the values of two propositions, that produces a value of true if at least one of its operands is true.

The truth table, Table 2, for p OR q (also written as p ∨ q, Apq, p ∥ q, or p+q) is as follows:

TABLE 2

Logical Disjunction

| p | q | p ∨ q |
|---|---|---|
| T | T | T |
| T | F | T |
| F | T | T |
| F | F | F |

For example, if p, then p ∨ q is p, otherwise p ∨ q is q. For example, where p and q are data bits, the syntax for p ∨ q in the Ruby programming language is: p | q.

Figure 1E:
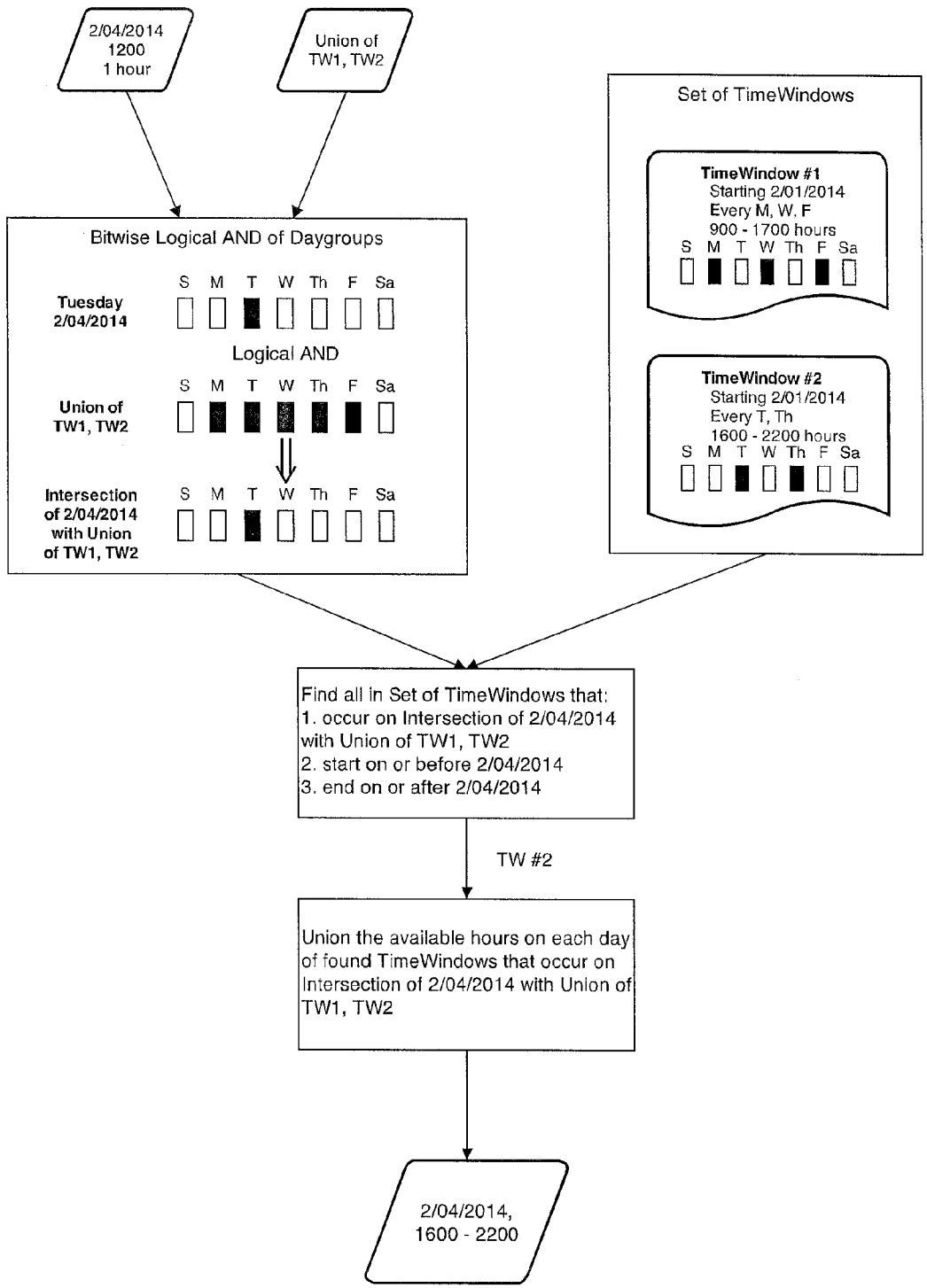
Figure 1F:
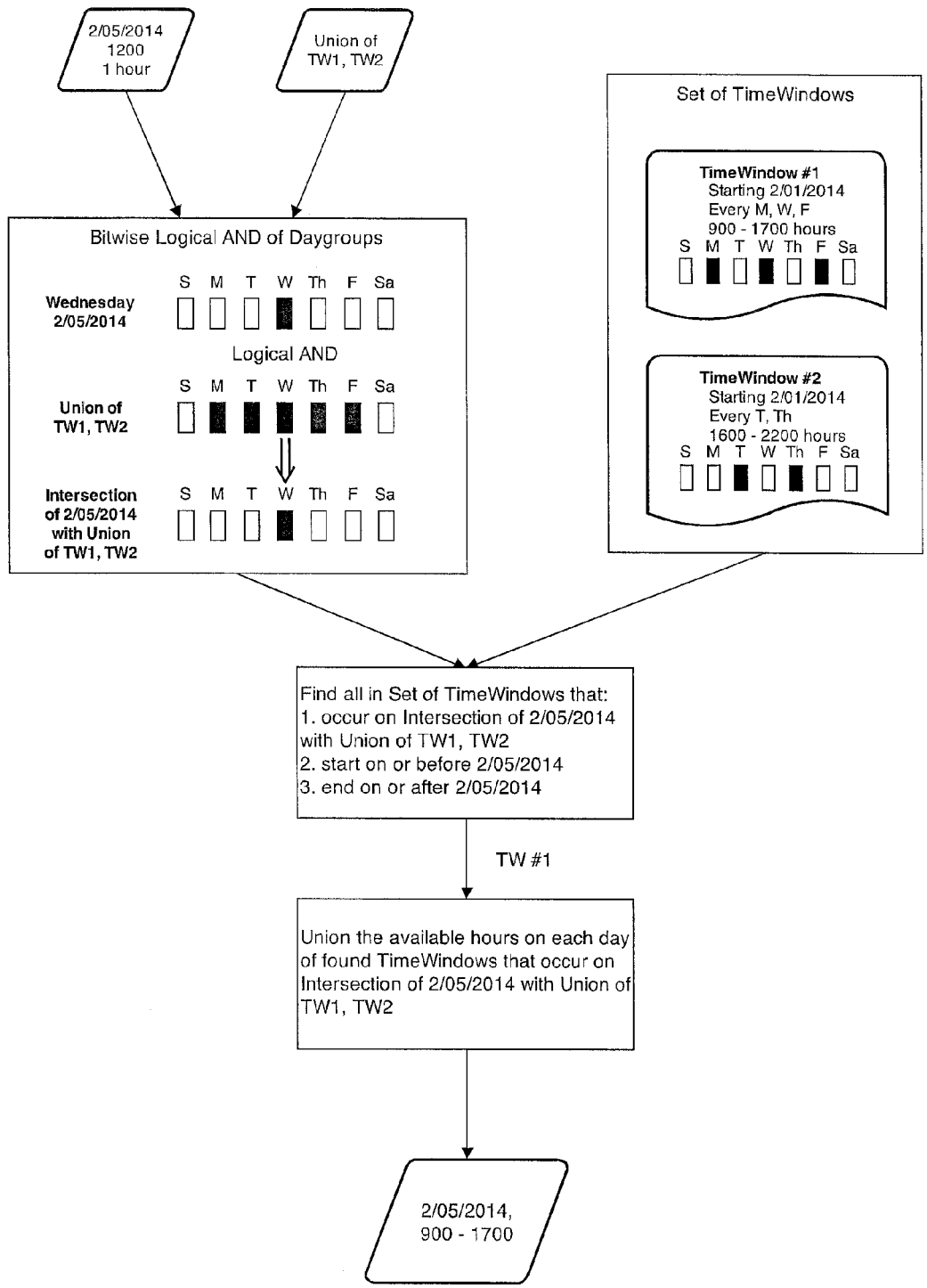
Figure 1H:
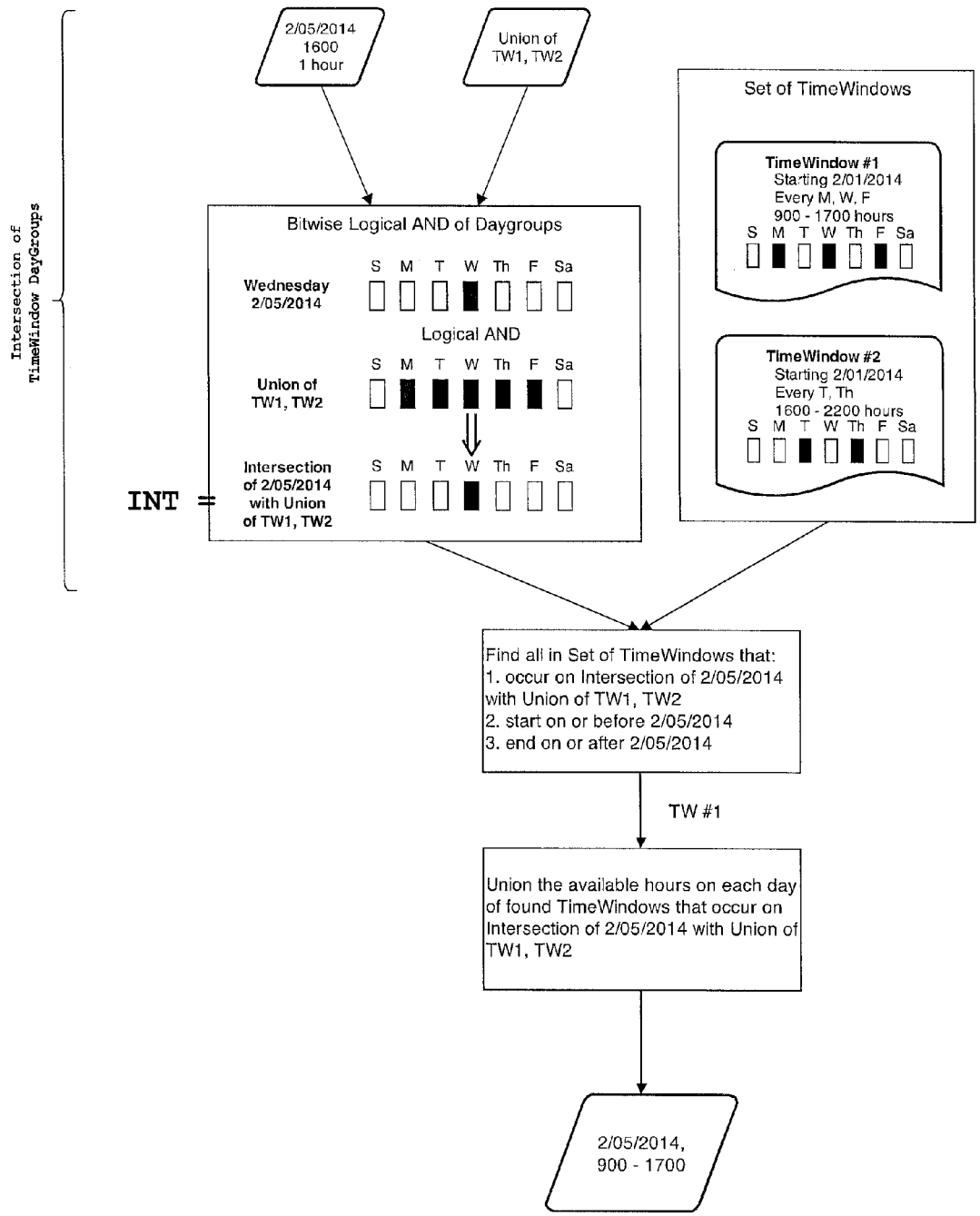
Figure 1I:
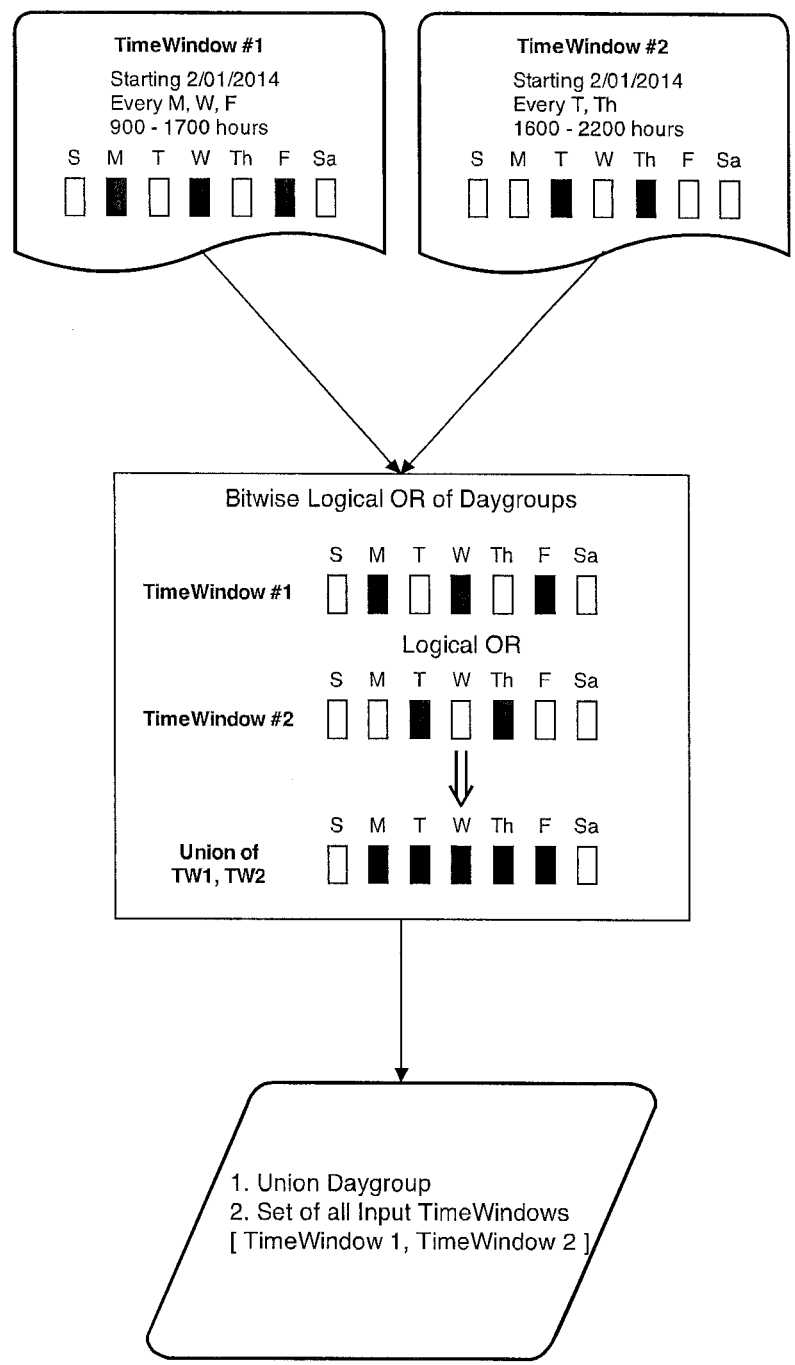
Figure 1J:
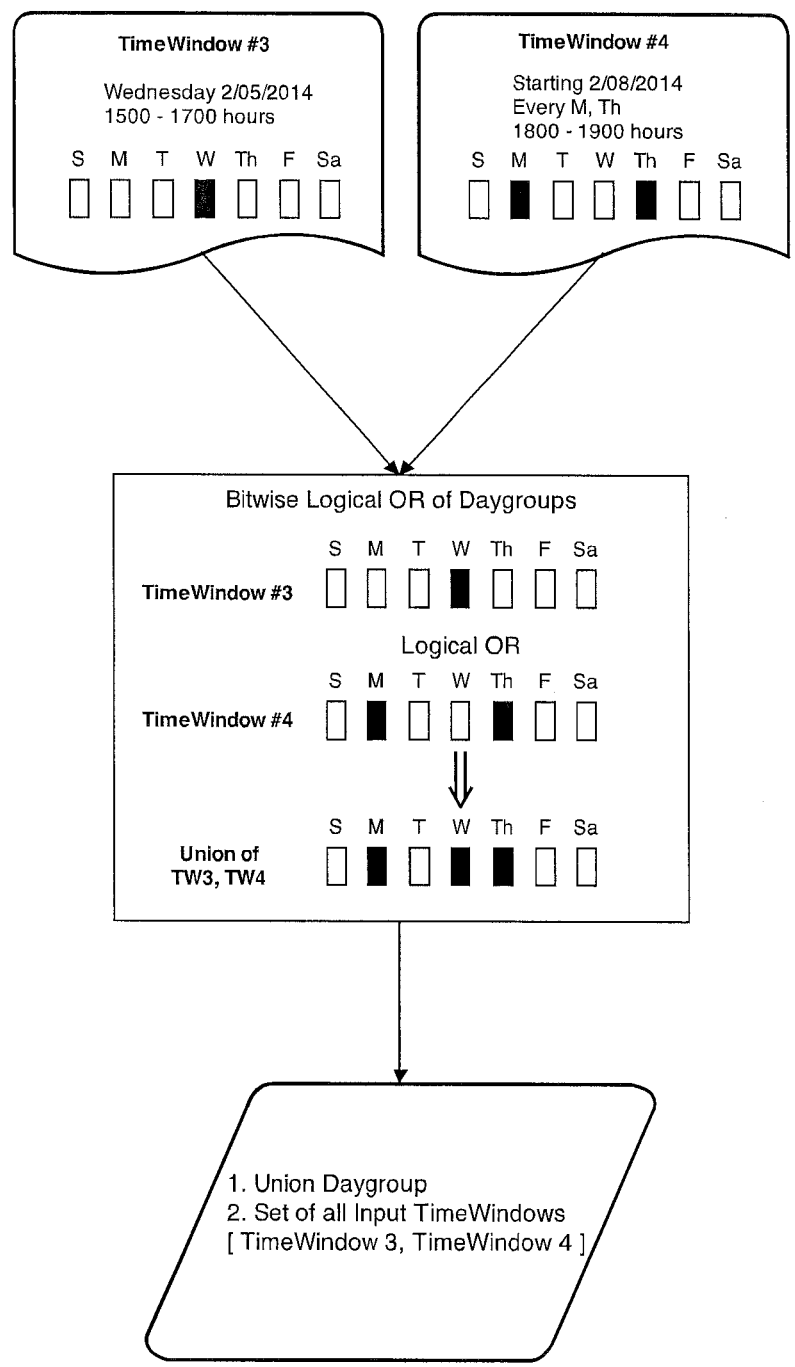

For example, in case of operations represented in FIG. 1E ("Intersection of TimeWindow Daygroups"), in the "Bitwise Logical AND of Daygroups" operation, the inputs can be represented as bitmasks of "0000100" (when Sunday corresponds to the right-most bit) and "0111110", respectively; and, then, the AND (intersection) operation produces the output which is represented by the bitmask of "0000100". In another example, in case of operations represented in FIG. 1I ("Union of TimeWindow Daygroups") ∧ ∧ ∨ —in the "Bitwise Logical OR of Daygroups" operation, the inputs can be represented as bitmasks of "0101010" and "0010100", respectively; and, then, the OR (union) operation produces the output which is represented by the bitmask of "0111110".

In the query of FIG. 1B, a user is utilizing the exemplary specifically programmed computer-implemented engine of the present invention to real-time, on-demand inquire (12) about availability of P on a specific day and time slot. The exemplary specifically programmed computer-implemented engine of the present invention then finds all advertised time windows (14). In some embodiments, the exemplary specifically programmed computer-implemented engine of the present invention executes a bitwise logical OR operation on all of the daygroup bit-string representations of advertised time, shown in FIG. 1I and in FIG. 1B (16), to compute a union ∪ of time windows, and in particular daygroups. In some embodiments, this union construct and/or discovered results from this union execution, "EX1U," can be reused in other queries such that the bitwise logical OR operation need not be performed for subsequent user queries, but can be retrieved from the computer memory. For example, in some embodiments, after a predetermined period of time passed since the execution of a particular construct (e.g., Union object, Intersection object), the discovered results are no longer utilized for subsequent querying.

In some embodiments, the exemplary specifically programmed computer-implemented engine of the present invention then executes a bitwise logical AND operation on the daygroup of the union previously determined or retrieved from memory, and the daygroup of the query, to compute an intersection ∩. For example, the exemplary specifically programmed computer-implemented engine of the present invention executes querying in accordance with bit-string representations of the union daygroup and of the query daygroup, shown in FIGS. 1E and 1B (18).

If the intersection returns an available day of week, the process flow continues to subsequent steps including but not limited to: comparison of available hours in the day that the intersection occurs on with the query hour, comparison with date value, and any other steps that could be necessary to complete the search aspect of the scheduling application. However, if no available day of week exists, i.e., the intersection at step (18) returns a null value, the process ends. Accordingly, as discussed above, the exemplary specifically programmed computer-implemented engine of the present invention does not need to perform the actual date comparisons and the time of day comparisons on unnecessary data sets.

In the example of FIG. 1B, the exemplary specifically programmed computer-implemented engine of the present invention determines, at an hour-comparison step, that the query hour is not within the available hours on the day that the intersection occurs, so the process flow ends, e.g., with a "not available" message delivered to the user, or a suitable indicator stored in a queue in a process flow involving a set of queries.

In the query of FIG. 1C, a user is utilizing the exemplary specifically programmed computer-implemented engine of the present invention to inquire (12) about availability of P on a specific day and time slot. The exemplary specifically programmed computer-implemented engine of the present invention then finds all advertised time windows (14). In the example query of FIG. 1C, the time windows were previously subjected to a bitwise logical OR operation and union EX1U was computed and stored, thus step (16) of FIG. 1B and the process sequence of FIG. 1I need not be repeated (unless the set of advertised time windows changes for the given P). In some embodiments, the exemplary specifically programmed computer-implemented engine of the present invention queries, periodically at a predetermined time interval and/or in real-time, to assess if the set of advertised time windows has changed. In a following step (18), the exemplary specifically programmed computer-implemented engine of the present invention then executes a bitwise logical AND operation of the daygroup union EX1U and the query daygroup to obtain an intersection ∩. In this example, the intersection returns a particular day, and the corresponding attributes concerning the hours of the day within that intersection day are shown. In the query of FIG. 1C, the exemplary specifically programmed computer-implemented engine of the present invention determines in the hour comparison step (20) that the query hour is within the available hours on the day that the time window intersection (18) occurs. In some embodiments, the exemplary specifically programmed computer-implemented engine of the present invention can ignore certain attributes including time of day and actual date until they are required at later stages of the flow.

In examples in which schedule S (FIG. 1A) contains time windows representative of unavailable time, based on the query flow in FIG. 1C, the exemplary specifically programmed computer-implemented engine of the present invention continues to determine whether the queried time slot is unavailable. In the example, schedule S (FIG. 1A) contains time window sets #3 and #4 indicative of unavailable (booked) time. These are identified (24) by the exemplary specifically programmed computer-implemented engine of the present invention in the process flow of FIG. 1C, and the exemplary specifically programmed computer-implemented engine of the present invention determines a union ∪ of these unavailable time window (24*a*), as detailed in FIG. 1J. In some embodiment, the exemplary specifically programmed computer-implemented engine of the present invention executes a bitwise logical OR operation on all of the daygroup bit-string representations of unavailable time windows. In some embodiments, the exemplary specifically programmed computer-implemented engine of the present invention then can reuse the resulting union dataset in other queries (not shown).

In a following step (26), the exemplary specifically programmed computer-implemented engine of the present invention executes a bitwise logical AND operation on the union previously determined (24) or retrieved from memory (not shown), and the daygroup of the query (see FIG. 1G), to compute an intersection ∪.

If the intersection of unavailable days results in the null determination, a query response can be returned to the user, stored, and/or passed to another step indicating that the requested query is available (based on the prior determination in step (20)). On the other hand, if the set returns one or more intersections, the the exemplary specifically programmed computer-implemented engine of the present invention continues, step (28), to determine whether the query hour on the intersection day is available.

As shown in FIG. 1G, TW3 and TW4, being unavailable, are considered "negative" values. Therefore, when TW3 having a time range of [1500-1700] is unioned with the query range of [900-1700] the result is [900-1500]. The negative values of TW3 results in its time range being subtracted.

FIG. 1D shows a process flow similar to that of FIG. 1C with a different query so that the determination at step (28) returns an "unavailable" result.

FIGS. 2A, 2B, 3A and 3B show additional examples using the herein systems and processes. Of course, a person having ordinary skill in the art would appreciate that the herein systems and processes of the present invention as described herein are able to query a numerous number of stored schedules for a number of potentially available time slots to identify available time slots which would otherwise not be available due to availability time slot mismatching.

FIG. 2A is another example of a data object representing a schedule S for a person P. In some embodiments, the exemplary specifically programmed computer-implemented engine of the present invention can utilize the software object representing the schedule S. In this example, the software object S can include four "time window" data object sets where each set has programmed attributes (day(s) of the week, start/end time and start date) of available time. For example, the attributes start date and start/end time can be represented as in conventional scheduling systems, e.g., date code and military time. The days of the week within each time window set are represented as a "daygroup" set. As shown in FIG. 2A, the daygroup set is a seven-slot bit string representation of the days of the week that could have availability, with Sunday being the least significant bit. In the depicted example a black square indicates that this position bit has a value of "1", or "ON", and a white square indicates a value of "0" or "OFF".

In some embodiments, the exemplary specifically programmed computer-implemented engine of the present invention utilizes the binary representation of a daygroup to union all available TimeWindows first, resulting in only one necessary comparison between desired date and union of all TimeWindows in order to answer a query.

Figure 2B:
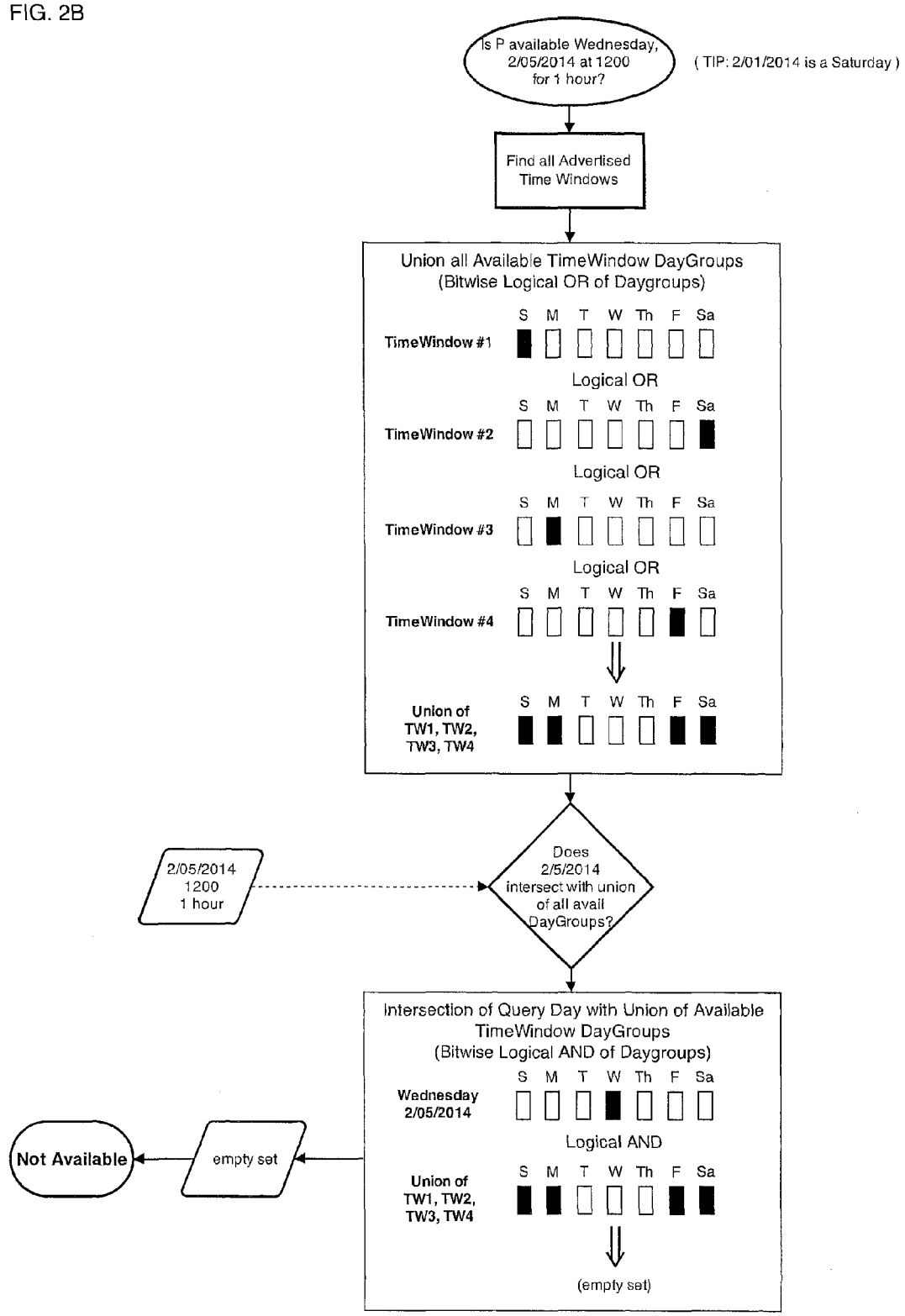
FIG. 2B is a flow chart showing programmed process flow in accordance with some principles of some embodiments of the present invention, for example, executing a sample query of the schedule S in FIG. 2A.

FIG. 2B, is a flow charts showing a sample query being executed by the exemplary specifically programmed computer-implemented engine of the present invention for specific day and time slots based on the schedule S represented by time window sets 1, 2, 3 and 4: Is P available Wednesday, Feb. 5, 2014 at 1200? A process flow for such query is represented in FIG. 2B.

In the query of FIG. 2B, a user utilizes the exemplary specifically programmed computer-implemented engine of the present invention to inquire about availability of P on a specific day and time slot. In some embodiments, the exemplary specifically programmed computer-implemented engine of the present invention then determines all advertised time windows (TimeWindows (TWs)). In some embodiments, the exemplary specifically programmed computer-implemented engine of the present invention executes a bitwise logical OR operation on all of the daygroup bit-string representations of advertised time to compute a union U of time windows, and in particular daygroups. This union can be reused by the exemplary specifically programmed computer-implemented engine of the present invention in other queries on the same schedule S of FIG. 2A, such that the bitwise logical OR operation need not be performed for subsequent user queries, but can be retrieved from memory (e.g., permanent and/or temporary computer storage).

In some embodiments, the exemplary specifically programmed computer-implemented engine of the present invention executes a bitwise logical AND operation on the daygroup of the union previously determined or retrieved from memory, and the daygroup of the query, to compute an intersection ∩. In some embodiments, the exemplary specifically programmed computer-implemented engine of the present invention executes in accordance with bit-string representations of the union daygroup and of the query daygroup. If the intersection returns an available day of week, the exemplary specifically programmed computer-implemented engine of the present invention continues to execute subsequent steps including but not limited to: comparison of available hours in the day that the intersection occurs on with the query hour, comparison with date value, and any other steps that could be necessary to complete the search aspect of the scheduling application. However, if no available day of week exists, as in the example query in FIG. 2B, the intersection at step returns an empty set or a null value, the exemplary specifically programmed computer-implemented engine of the present invention then stops the execution and can return an indication of such outcome (e.g., a "not available" alert/message delivered to the user), and/or assign/associated/store a suitable indicator e, for example, in a queue in a process flow involving a set of queries.

Figure 3A:
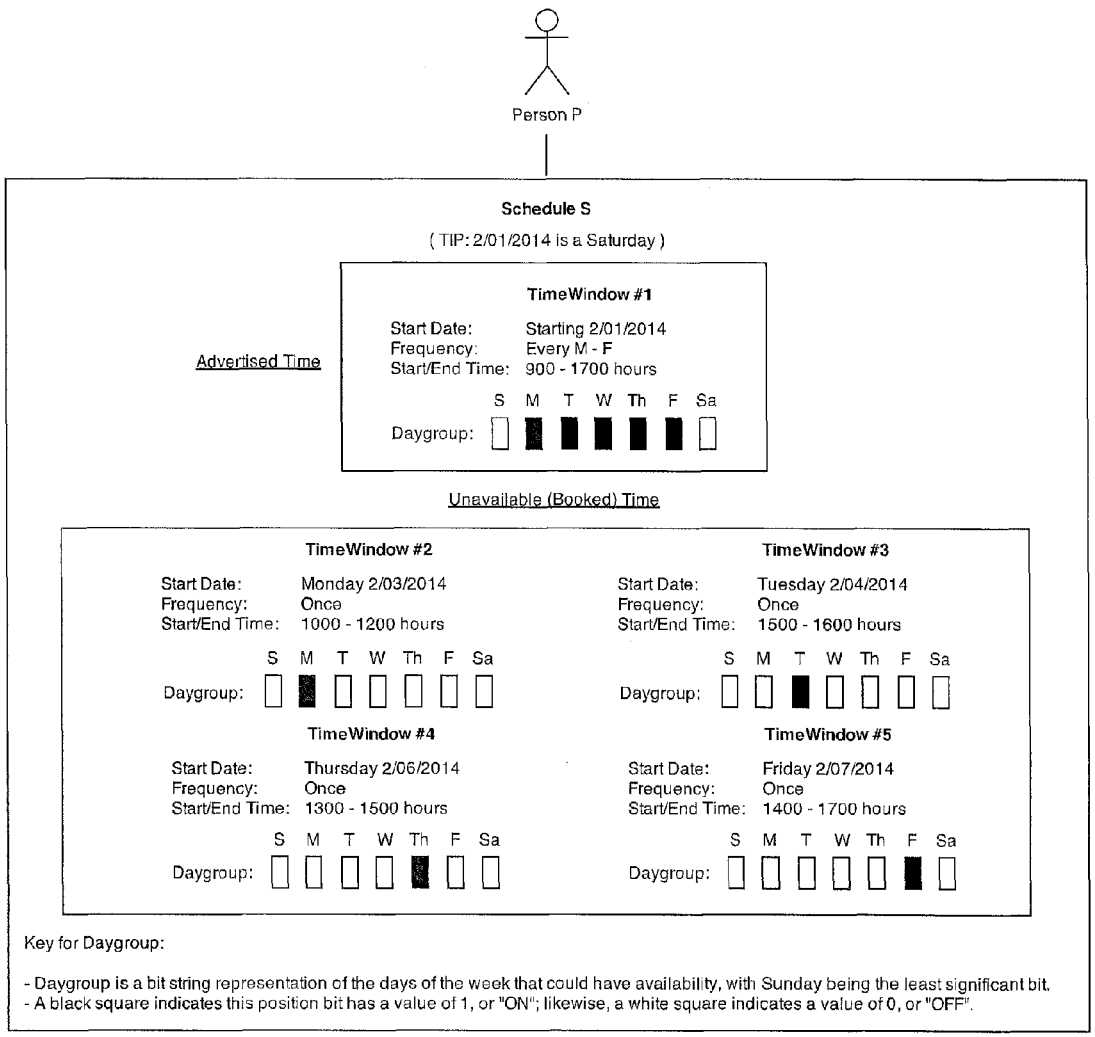
FIG. 3A is a representation of a software implementation related to a schedule S including an expanded number of bookings in accordance with some principles of some embodiments of the present invention.

FIG. 3A is a representation of another example of a software execution performed by the exemplary specifically programmed computer-implemented engine of the present invention regarding a schedule S for a person P. In this example, S includes one "time window" set that represents attributes (day(s) of the week, start/end time and start date) of available time, and four time window sets that each represent attributes of unavailable (booked) time. The attributes start date and start/end time can be represented as in conventional scheduling systems, e.g., date code and military time. The days of the week within each time window set are represented as a "daygroup" set. As shown in FIG. 3A, the daygroup set is a seven-slot bit string representation of the days of the week that could have availability, with Sunday being the least significant bit. In the depicted example a black square indicates that this position bit has a value of "1", or "ON", and a white square indicates a value of "0" or "OFF".

In some embodiments, the exemplary specifically programmed computer-implemented engine of the present invention utilizes the binary representation of a daygroup to union all unavailable TimeWindows and subtract that union from the set of available days in order to determine if a desired date is still available.

In examples in which schedule S (FIG. 3A) contains time windows representative of unavailable time, the query flow in FIG. 3B proceeds similar to that of FIG. 2B. As shown in FIG. 3B, the intersection ∩ of the desired query data with the TimeWindow#1 returns a non-empty set, i.e., an availability. In some embodiments, the exemplary specifically programmed computer-implemented engine of the present invention then determines whether the query time of day is within the TimeWindow #1 attributes. In the example of FIG. 3B, the query time of day is available based on the TimeWindow #1 attributes.

In some embodiments, the exemplary specifically programmed computer-implemented engine of the present invention continues (the upper left portion of the flow diagram in FIG. 3B) to determine whether the queried time slot is unavailable. In the example, schedule S (FIG. 3A) contains time window sets #2, #3, #4 and #5 indicative of unavailable (booked) time. These are identified in the process flow of FIG. 3B, and a union ∪ of these unavailable time window is obtained. In some embodiments, the exemplary specifically programmed computer-implemented engine of the present invention executes a bitwise logical OR operation on all of the daygroup bit-string representations of unavailable time windows. In some embodiments, the exemplary specifically programmed computer-implemented engine of the present invention can reuse the resulting union in other queries (not shown) that search the same schedule S (i.e., until new bookings arise thus requiring additional TimeWindows representative of unavailable time). Then, in some embodiments, the exemplary specifically programmed computer-implemented engine of the present invention can execute a bitwise logical AND operation on the union previously determined or retrieved from memory (not shown), and the daygroup of the query, to compute an intersection ∩. If the intersection of unavailable days results in the null determination, a query response can be returned to the user, stored, and/or passed to another step indicating that the requested query is available). On the other hand (not shown in FIG. 3B), if the set returns one or more intersections, the exemplary specifically programmed computer-implemented engine of the present invention is configured to continue to determine whether the query hour on the intersection day is available.

FIG. 4 is a schematic diagram of example schedules and a sample specifically programmed updateable user graphical interface caused to be generated by the exemplary specifically programmed computer-implemented engine of the present invention. In the data representation portion of FIG. 4, example schedules are set forth including "Availability 1," "Availability 2," "Unavailability 1," and "Unavailability 2." In the availability portions, the daygroup is represented by the days of the week that could have availability, with a black square indicating this position it has a value of 1, or "ON," and a white square indicates a value of 0, or "OFF." In the unavailability portions, this example schedule is modified as compared to the previous depictions. In this representation, unavailability is represented by, for example but not limited to, black lines within the square corresponding to particular appointment times. In the exemplary specifically programmed updateable availability user graphical interface for the user, the exemplary specifically programmed computer-implemented engine of the present invention utilizes we can see in this example that there is no availability on Wednesday (a white block), there is availability for the entire Thursday, and there were periods of availability and periods of unavailability on Friday. The representative block for Friday is the availability for Friday minus the unavailability for Friday. In some embodiments, the exemplary specifically programmed computer-implemented engine of the present invention is configured to allow the user to book a particular available time slot.

Figure 5:
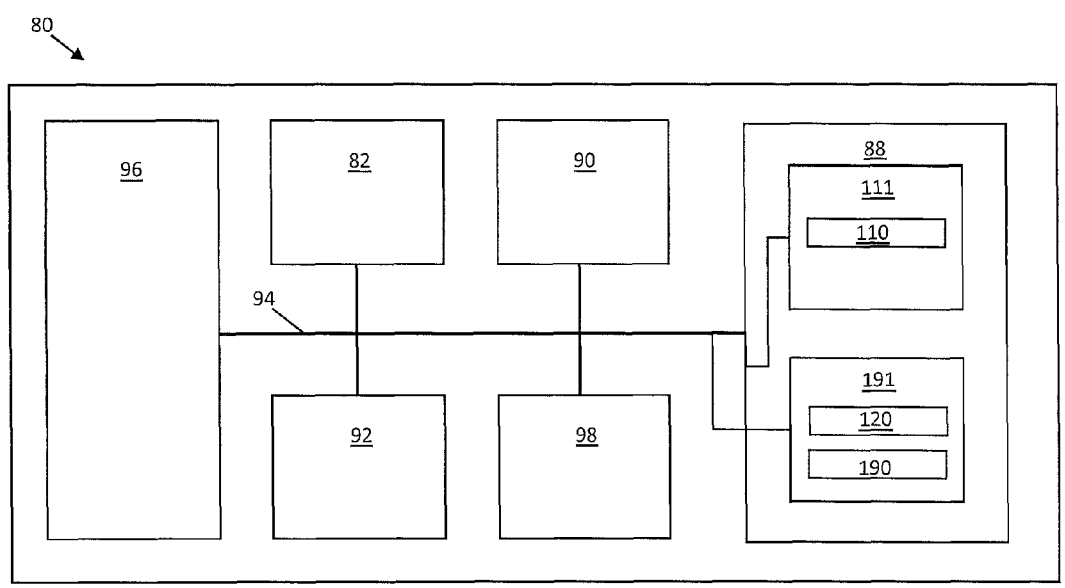
FIG. 5 is a block diagram of a exemplary specifically programmed engine computer system in accordance with some principles of some embodiments of the present invention.

An exemplary block diagram of a computer system 80 by which the scheduling modules of the present invention can be implemented is shown in FIG. 5. Computer system 80 includes a processor 82, such as a central processing unit, an input/output interface 90 and support circuitry 92. In certain embodiments, where the computer 80 requires a direct human interface, a display 96 and an input device 98 such as a keyboard, mouse or pointer are also provided. The display 96, input device 98, processor 82, and support circuitry 92 are shown connected to a bus 94 which also connects to a memory 88. Memory 88 includes program storage memory 111 and data storage memory 191. Note that while computer 80 is depicted with direct human interface components display 96 and input device 98, programming of modules and exportation of data can alternatively be accomplished over the interface 90, for instance, where the computer 80 is connected to a network and the programming and display operations occur on another associated computer, or via a detachable input device as is known with respect to interfacing programmable logic controllers.

Program storage memory 111 and data storage memory 191 can each comprise volatile (RAM) and non-volatile (ROM) memory units and can also comprise hard disk and backup storage capacity, and both program storage memory 111 and data storage memory 191 can be embodied in a single memory device or separated in plural memory devices. Program storage memory 111 stores software program modules and associated data, and in particular stores one or more modules 110. Data storage memory 191 stores the data sets representative of the schedules S including advertised time, bookings (unavailable time) and any union data generated by the one or more modules of the present invention to be reused.

It is to be appreciated that the computer system 80 can be any computer such as a personal computer, minicomputer, workstation, mainframe, a dedicated controller such as a programmable logic controller, or a combination thereof. While the computer system 80 is shown, for illustration purposes, as a single computer unit, the system can comprise a group/farm of computers which can be scaled depending on the processing load and database size. In certain embodiments, the system and method herein can be operate on a user's computer, for instance, in a user's browser, querying among schedule data that resides on the user's machine, after having been downloaded without query from a networked server computer. However, not all of these components may be required to practice the invention, and variations in the arrangement and type of the components may be made without departing from the spirit or scope of the invention. In some embodiments, the inventive system and method may include a large number of users and/or concurrent transactions. In other embodiments, the instant inventive systems are based on a scalable computer and network architecture that incorporates various strategies for assessing the data, caching, searching, and database connection pooling. An example of the scalable architecture is an architecture that is capable of operating multiple servers that are in real-time communicating with numerous electronic devices of users (e.g., smartphones). In some embodiment, the inventive systems of present invention can host a large number of electronic devices of users (e.g., at least 100; at least 1,000, at least 10,000; at least 100,000; at least 1,000,000; at least 1,000,000,000, etc.) and/or perform a large number of concurrent actions/transactions (e.g., at least 1,000; at least 10,000; at least 100,000; at least 1,000,000, at least 1,000,000,000, etc.) with a numerous data Schedule S and TimeWindows sets (e.g., at least 1,000; at least 10,000; at least 100,000; at least 1,000,000, at least 1,000,000,000, etc.).

The computing device 80 preferably supports an operating system, for example stored in program storage memory 111 and executed by the processor 82 from volatile memory. According to an embodiment of the invention, the operating system contains instructions for interfacing the device 80 to the scheduling modules.

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the present invention offers/manages the cloud computing/architecture as, but not limiting to: infrastructure a service (IaaS), platform as a service (PaaS), and software as a service (SaaS).

Illustrative exemplary programming code utilized in programming the exemplary specifically programmed computer-implemented engine of the present invention to book an available time slot is provided below.

```
The Book method

    # Attempts to book a specific time slot. 'object' is the Service being booked.
    def book!(params={ })
        # finds all available schedules for search params...
        schedules = object.available_schedules_near(params)
        # there's a problem if requested duration is less than Service duration...
        params[:duration] ||= object.duration
        raise   Exceptions::InvalidParams.new("422   Requested   :duration
#{params[:duration]} is less than Service duration #{object.duration}#) unless params[:duration]
>= object.duration
        booking = nil
        # iterate through available schedules...
        schedules.each do |schedule|
            gb_transaction do
                schedule.lock! # with lock....
                # check if schedule is still available...
                if schedule.has_availability_at?(params)
                date = params[:date]
                tw = TimeWindow.factory!({
                    'negation' => true,
                    'recurs_by' => 'once',
                    'frequency' => 'single',
                    'start_date' => date,
                    'days' => date.strftime('%A').downcase,
                    'start_time' => mil_to_mins(date.strftime('%H%M').to_i),
                    'end_time'   =>   mil_to_mins((date   +
duration.minutes).strftime('%H%M').to_i),
                    'total_minutes' => duration
                }.merge(params))
                schedule.time_windows << tw
                # creates the booking...
                booking = Booking.create!(user_id: params[:booker_id], time_window_id:
tw.id)
                # clear any cache of availabilities...
                schedule.clear_availability_cache(tw)
            end
        end
        break if booking # we only need to book for first available Schedule found...
    end
    booking
  end
end

book! calls Service.available_schedules_near to find availabilities

Service.available_schedules_near defers to Schedule.has_availability_near?

Schedule.has_availability_near? defers to Schedule.availabilities

Schedule.availabilities defers to Schedule.time_window_availabilities

    def time_window_availabilities(options={ })
        available = SortedSet.new
        if options[:date]
            # select relevant TimeWindows if specific date in daygroup, then collect
possible day availabilities.
            available_time_windows.select{|tw|
tw.in_daygroup?(options[:date])}.each{|tw| available += tw.events(options)}
        elsif options[:start_dt] and options[:end_dt]
            # if dealing with a range, test each day in range
            date = options[:start_dt]
            while date < options[:end_dt]
                available_time_windows.select{|tw|    tw.in_daygroup?(date)}.each{|tw|
available += tw.events(options)}
                date += 1.day
            end
        else
            # no specific date to match daygroups against...
            available_time_windows.each{|tw| available += tw.events(options)}
        end
        available
```

```
    end
    ###
    ## TimeWindow.in_daygroup?. date.wday is the weekday of date.
    ###
        def in_daygroup?(date)
            daygroup & (2**date.wday) > 0 ## <== the & is Ruby syntax for a bitwise
intersection
            end
    ###
    ## TimeWindow.daygroup
    ## daygroup - set of active (boolean) day of week fields expressed as a bitwise
sum of 2 (day of week) with :sunday => 0 as per Ruby/Rails convention
    ## e.g. daygroup(:sunday=>true) implies integer value == 1
    ##      daygroup(:monday=>true) implies integer value == 2
    ##      daygroup(:saturday=>true) implies integer value == 64
    ##          daygroup(:sunday=>true, :monday=>true, :tuesday=>true,
:wednesday=>true, :thursday=>true, :friday=>true, :saturday=>true) implies integer value ==
127
    ###
        # return the integer bitwise addition of the days of week as powers of 2 (see
comment in header)
        def daygroup
            dg_bit = 0
            # we rotate once from the end to start with sunday, instead of monday as
Time::DAYS_INTO_WEEK does
            Time::DAYS_INTO_WEEK.keys.rotate(-1).each_with_index{ |day,   index|
dg_bit |= 1 << index if self.send("#{day}?".to_sym)}
            dg_bit
        End
```

Illustrative example of Application Program Interface code (API) having exemplary rules utilized in programming and operation of the exemplary specifically programmed computer-implemented engine of the present invention to book available time slots In some embodiments, the API is configured/programmed to allow to manage Users and their Resources, such as:

the Services/Activities the Users and/or their Resources offer the Schedules of Services/Activities the Booking of a Service at a particular time Users can Search for any available scheduled Services/Activities Basic Users In some embodiments, a Basic User cannot create any Resources, the only Resource they have is themselves. In some embodiments, a Basic User can create Services/Activities but they must be offered at no charge. In some embodiments, Basic User accounts are free for the first year, and $1 per year after the first year.

Pro Users

In some embodiments, any Basic account can be upgraded to a Pro account. In some embodiments, Pro Users are able to create additional Resources under their account. These Resources can have their own Schedules as well as Services/Activities offered. Pro Users are also able to offer Services/Activities at a price to the customer. The price of a Service/Activity can be fixed for the duration of the appointment, hourly, or various other options.

Access to the API

In some embodiments, Pro Users automatically gain access to the API. The API allows for the creation and management of the Pro User's Resources, Services/Activities, Schedules and Bookings Account Manager The API allows creation of other accounts for which the Pro User becomes the defacto Account Manager. The Pro User, via API, can then create and manage Resources, Services/Activities, and Schedules of Users for which they are the Account Manager. Account Managers have only limited access to manage the Bookings of their managed Users. In some embodiments, any Users created via API are completely viewable and have their Services and Schedules.

Figure 6:
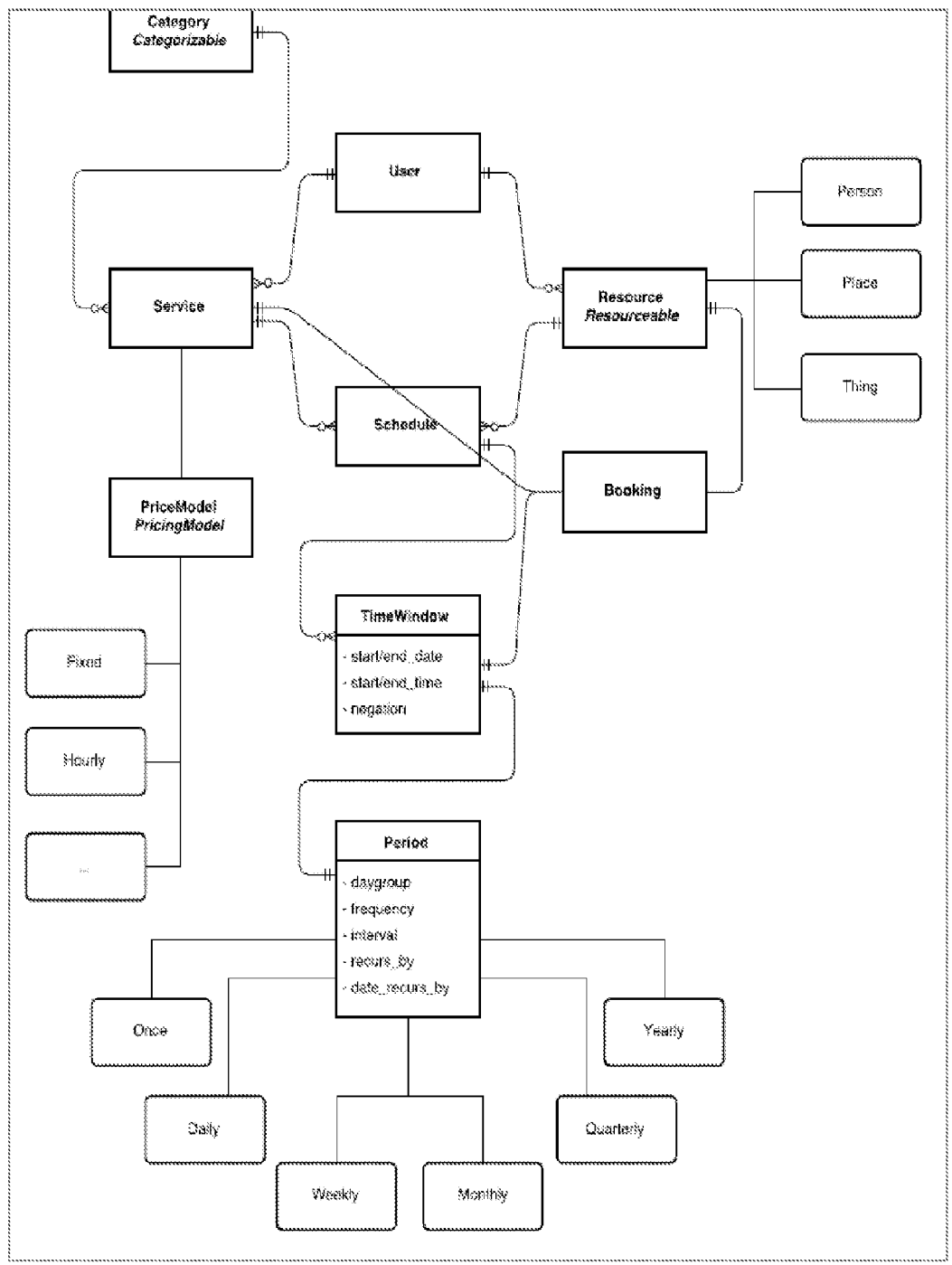
FIG. 6 is a block diagram in accordance with some principles of some embodiments of the present invention.

Entities (Programmed Objects) (FIG. 6)

There are several Entities in the system accessible via API:

Users

Services/Activities

PricingModels

Schedules

Resources

Categories

Search Results

Bookings

Getting started using the API to make a User with Services that are advertised can be done, for example, in as few as 5 steps. Use this walk-through to get up and running:

Step 1—Obtain Your Key

Step 2—Create a User

Step 3—Create a Service

Step 3.1—(Optional) Create a Category and associate with Service

Step 3.2—(Optional) Associate a Price Model with Service

Step 4—Create a Schedule for the new Service

Step 5—Check your work!

Step 1—Obtain an API Key

In some embodiments, to obtain an API Key, you must be registered as a GoneBusy User. You must upgrade from a Basic to a Pro account. Once upgraded you can request an API Key from the Pro settings page. After agreeing to the Terms & Conditions of API access and usage, you will be issued an API Key. Keep this Key private. If you lose the Key, or feel it has been compromised, you can request another Key, which will make any previous keys invalid. The API Key value is passed as a parameter to all API requests, using the parameter name 'api_key'.

Step 2—Create a User

Once registered, your own User account has been created for you. As a Pro User, you can now make changes via API to your own User account as well as create/update other User accounts. For any User accounts that you create via API, you are the Account Manager for those User accounts. Likewise, any User account created via API could also (after upgrading to a Pro account) obtain their own API Key and manage their own account as well as any additional User accounts that they create via the API.

```
Request:
Here is a sample POST request to create a new User:
with POST body:
    "email": "tutor@youremail.com",
    "first_name": "Private",
    "last_name": "Tutor",
    "business_name": "Tutors-R-Us",
    "external_url": "tutors-r-us.sample.biz",
    "timezone": "EST",
    "api_key": "ac98ed08b5b0a9e7c43a233aeba841ce"
Response:
Here is the response to the request, note the ID of our new User:
"Status": "201 Created"
{
  "user": {
    "id": 54,
    "email": "tutor@youremail.com",
    "first_name": "Private",
    "last_name": "Tutor",
    "disabled": false,
    "business_name": "Tutors-R-Us",
    "external_url": "tutors-r-us.sample.biz",
    "permalink": null,
    "timezone": "EST",
    "created_at": "2014-10-04T19:46:26Z",
    "updated_at": "2014-10-04T19:46:26Z",
    "resource_id": 267,
    "account_manager_id": 22,
    "address": null
  }
}
Step 3 - Create a Service/Activity
A sample POST request to create a Service for our sample User:
Request:
with POST body:
    "user_id": 54,
    "name": "LSAT/MCAT Tutoring",
    "description": "Tutoring for LSAT or MCAT exams. Available by the hour.",
    "duration": 60,
    "api_key": "ac98ed08b5b0a9e7c43a233aeba841ce"
Response:
"Status": "201 Created"
{
  "service": {
    "id": 4183,
    "owner_id": 54,
    "resources": [ 267 ],
    "name": "LSAT/MCAT Tutoring",
    "short_name": null,
    "duration": 60,
    "description": "Tutoring for LSAT or MCAT exams. Available by the hour.",
    "price_model_id": null,
    "is_active": true,
    "categories": "[ ]"
  }
}
```

Step 3.1—Create a Category and Associate with a Service/Activity

The Service/Activity created in Step 3 above was not Associated with any Categories during creation. We could have searched for Categories that already exist in the system and then specified the IDs of Categories at the time of Service/Activity creation. We can also make our own Category as follows.

Here is a sample POST request to create a Category:

```
Request:
with POST body:
    "name": "Graduate School Exam Preparation",
    "description": "Services related to preparing for graduate-level entrance exams such as LSAT, MCAT, etc.",
    "api_key": "ac98ed08b5b0a9e7c43a233aeba841ce"
Response:
"Status": "201 Created"
{
  "category": {
    "id": 23,
    "name": "Graduate School Exam Preparation",
    "short_name": null,
    "long_name": null,
    "description": "Service related to preparing for graduate-level entrance exams such as LSAT, MCAT, etc.",
    "parent_category_id": null,
    "is_active": true,
    "subcategories": [ ]
  }
}
```

In some embodiments, we can now assign our recently created Service to this Category. You can assign multiple Categories at once with a comma-delimited list of Category IDs, or just provide a single Category ID.

```
Request:
with PUT body:
    "categories": "[ 23 ]",
    "api_key": "ac98ed08b5b0a9e7c43a233aeba841ce"
Response:
"Status": "200 OK"
{
  "service": {
    "id": 4183,
    "owner_id": 54,
    "resources": [ 267 ],
    "name": "LSAT/MCAT Tutoring",
    "short_name": null,
    "duration": 60,
    "description": "Tutoring for LSAT or MCAT exams. Available by the hour.",
    "price_model_id": null,
    "is_active": true,
    "categories": [
      {
        "id": 23,
        "name": "Graduate School Exam Preparation",
        "short_name": null,
        "long_name": null,
        "description": "Service related to preparing for graduate-level entrance exams such as LSAT, MCAT, etc.",
        "parent_category_id": null,
        "is_active": null,
        "subcategories": [ ]
      }
    ]
  }
}
```

Step 3.2—(Optional) Associate a PricingModel with a Service

The Service created in Step 3 above was not Associated with a PricingModel during creation. Recall that a Service defaults to having "Activity" pricing if no PricingModel is specified, which means it must be offered at no charge. If we want to charge for our new Service, let's create an appropriate PricingModel and associate it with our Service.

Here is a sample POST request to create a PricingModel:

```
Request:
    with POST body:
        "type": "ByTheHour",
        "price": 50.0,
        "name": "Tutoring Hourly Rate",
        "notes": "Applies to LSAT, MCAT, SAT as well",
        "api_key": "ac98ed08b5b0a9e7c43a233aeba841ce"
    Response:
    "Status": "201 Created"
    {
        "pricing_model": {
            "id": 126,
            "name": "Tutoring Hourly Rate",
            "price": 50.00,
            "currency": "USD",
            "notes": "Applies to LSAT, MCAT, SAT as well",
            "pricing_model_type": "ByTheHour"
        }
    }
```

We can now assign our recently created Service to this PricingModel using the ID of the PricingModel we just created:

```
Request:
with PUT body:
    "price_model_id": 126,
    "api_key": "ac98ed08b5b0a9e7c43a233aeba841ce"
Response:
"Status": "200 OK"
    {
        "service": {
            "id": 4183,
            "owner_id": 54,
            "resources": [ 267 ],
            "name": "LSAT/MCAT Tutoring",
            "short_name": null,
            "duration": 60,
            "description": "Tutoring for LSAT or MCAT exams. Available by the hour.",
            "price_model_id": 126,
            "is_active": true,
            "categories": [
                {
                    "id": 23,
                    "name": "Graduate School Exam Preparation",
                    "short_name": null,
                    "long_name": null,
                    "description": "Service related to preparing for graduate-level entrance exams such as LSAT, MCAT, etc.",
                    "parent_category_id": null,
                    "is_active": null,
                    "subcategories": [ ]
                }
            ]
        }
    }
```

Step 4—Create a Schedule for the New Service

Now that a new User and Service have been created, we need to create a Schedule that specifies when the Service will be offered by the new User. In some embodiments, without an explicit resource_id passed, the default resource of our new User will be assigned the new Schedule. Let's create the following Schedule for our "LSAT/MCAT Tutoring" Service: "Starting November 1st until January 31st, available every Monday, Wednesday, Friday from 4 pm to 11 pm." A Schedule is made up of many TimeWindows but for convenience it is encouraged to create a Schedule by passing parameters that will also create the first TimeWindow in addition to the new Schedule. The following POST to create a Schedule will also create a TimeWindow that corresponds to the above availability:

```
Request:
    with POST body:
        "service_id": 4183,
        "user_id": 54,
        "start_date": "2014-11-01",
        "end_date": "2015-01-31",
        "start_time": "4 pm",
        "end_time": "11 pm",
        "recurs_by": "weekly",
        "days": ["monday", "wednesday", "friday"],
        "api_key": "ac98ed08b5b0a9e7c43a233aeba841ce"
    Response:
    "Status": "201 Created"
    {
        "schedule": {
            "id": 8090,
            "service_id": 4183,
            "resource_id": 267,
            "time_windows": [
                {
                    "id": 10536,
                    "start_date": "2014-11-01",
                    "end_date": "2015-01-31",
                    "start_time": "4 pm",
                    "end_time": "11 pm",
                    "total_minutes": 420,
                    "recurs_by": "weekly",
                    "days": ["monday", "wednesday", "friday"],
                    "frequency": "every",
                    "occurrence": "every",
                    "date_recurs_by": null,
                    "negation": false
                }
            ]
        }
    }
```

Step 5—Check Your Work

Now that our Schedule has been created for our "LSAT/MCAT Tutoring" Service, lets check what our available bookable time slots are on November 3rd:

```
Request:
GET
http://beta.gonebusy.com/api/v1/services/4183/available_slots.json?date=11-03-2014
Response:
"Status": "200 OK"
{
    "service": {
        "id": 4183,
        "owner_id": 54,
        "resources": [
            {
                "id": 267,
                "available_slots": [
                    {
                        "date": "2014-11-03",
                        "slots": [ "04:00:00 PM", "04:15:00 PM", "04:30:00 PM", "04:45:00 PM", "05:00:00 PM", "05:15:00 PM", "05:30:00 PM", "05:45:00 PM", "06:00:00 PM", "06:15:00 PM", "06:30:00 PM", "06:45:00 PM", "07:00:00 PM", "07:15:00 PM", "07:30:00 PM", "07:45:00 PM", "08:00:00 PM", "08:15:00 PM", "08:30:00 PM", "08:45:00 PM", "09:00:00 PM", "09:15:00 PM", "09:30:00 PM", "09:45:00 PM", "10:00:00 PM" ]
                    }
                ]
            }
        ]
    }
}
```

Exemplary Entities

Users

Users are the people that participate on GoneBusy. If you haven't done so already, take a look at our explanation of how Users interact with GoneBusy on the "How GoneBusy Works" page. In some embodiments, the API allows a Pro User to manage themselves or an Account Manager to operate on managed users in order to offer services, schedule availability, and various other operations.

Services/Activities

In some embodiments, Bookings would not be possible without users offering their Services/Activities. Services can be anything that someone, or a group of professionals at a business, offers for a fee that requires a time commitment. Activities also require a time commitment but don't require charging a fee—for instance, Activities are things one shares with friends.

PricingModels

Each Service a User offers must have a PricingModel associated with it in order to specify how to charge for the Service. There are several types of PricingModels, including "Activity" which means the Service is actually an Activity that has no charge Associated with it. When a Service is created without specifying a PricingModel, by default it will have an Activity PricingModel Associated with it. To create a new PricingModel, one must specify the type of Pricing-Model (see below) along with any additional attributes the specific PricingModel requires.

There are several types of PricingModels that can be assigned to a Service. If you have a need to price a Service/Activity in a manner that is not accommodated by any of the PricingModels below, please let us know and we'll be happy to assist you with creating a new Pricing-Model if necessary. In some embodiments, PricingModels can be of the following types:

1) Activity—when a Service is free of charge, such as an Activity you only share with friends, you can specify the Activity type when creating a PricingModel for the Service.
   Attributes:
   name (optional)—an optional name for the PricingModel
   notes (optional)—an optional notes field for the Pricing-Model 2) FixedPrice—if the price of a Service is constant, no matter the duration a customer can reserve for, specify the FixedPrice type when creating a PricingModel for the Service. An example of such a Service would be a "Man with a Van" that charges for the entire day of work no matter whether the customer requested 2 hours or 8 hours of time on any given day.
   Attributes
   price (required)—price that will be charged for the entire Service
   currency (optional)—currency of price. Defaults to USD
   name (optional)—an optional name for the PricingModel
   notes (optional)—an optional notes field for the Pricing-Model 3) ByTheHour—when Services are charged for each hour being reserved, specify the ByTheHour type when creating a PricingModel for the Service. There are many examples of businesses that offer Services or classes by the hour, such as salons, yoga studios, guitar lessons, etc.
   Attributes
   price (required)—price that will be charged for each hour reserved
   currency (optional)—currency of price. Defaults to USD
   name (optional)—an optional name for the PricingModel
   notes (optional)—an optional notes field for the Pricing-Model 4) ByTheMinute—when Services are charged for each minute being reserved, specify the ByTheMinute type when creating a PricingModel for the Service. Examples of Services that may charge by the minute may include tutoring, a help line, etc.
   Attributes
   price (required)—price that will be charged for each minute reserved
   currency (optional)—currency of price; defaults to USD
   description (optional)—an optional description for the PricingModel Resources Resources are what actually provide Services/Activities. By default, a Basic User is a Resource for their own Services/Activities (recall that a Basic User can only offer free Activities while a Pro User can charge a fee for their Services). Pro Users are able to create additional Resources for Services, besides just offering Services themselves. The following types of Resources may be created:

1) Person—a User can create another Person Resource, such as another instructor at a gym, or a therapist at a spa.
   Attributes
   first_name—person's first name
   last_name—person's last name 2) Place—a Place Resource would apply to something like a classroom, which hosts a particular Service at a time, or maybe a meeting room online where tutoring is offered.
   Attributes
   name—the name of this Place
   capacity—an optional limit to how many Bookings are allowed at a single time for this Place 3) Thing—a Thing Resource would apply to something like a van or equipment which is offered for rent for a certain amount of time.
   Attributes
   name—the name of this Thing 4) Schedules Schedules: they start on a date, may end on a date, or possibly repeat indefinitely; falling between certain hours on particular days of the week. By defining a Schedule for a Service that is offered by a Resource, it is possible to advertise the available times the Service may be booked. In some embodiments, a Schedule is made up of a single or many TimeWindows, where the most important attributes of a TimeWindow are the following:
   start_date—what date it begins on;
   end_date—what date it ends on (if any); no end_date means this scheduled window of time is valid forever;
   days—the days of the week it falls on, such as Sunday through Saturday, everyday, weekends, etc.;
   start_time—the earliest appointment time for the service;
   end_time—when the last appointment must be finished by.

Types of Recurring TimeWindows

In some cases, a period of advanced time will continue be offered in a recurring fashion, such as:
   daily—specify this kind of recurrence if a Service is offered every single day at the same time (this makes specifying days unnecessary).
   weekly—something that recurs every week, such as a class
   monthly—something that recurs every month (it is possible to specify that something recurs only the first week of each month as well)
   yearly—this is useful for Services that happen on some date or stretch of days every year Frequency Frequency is a kind of multiplier for how the TimeWindow recurs. For example, a monthly TimeWindow with days='weekend' and frequency='every other' and interval='every' implies that we are interested in a TimeWindow that actually recurs "every weekend every other month".

Occurrence

Interval tells us exactly which instance of a TimeWindow's recurrence we are interested in. For example, a monthly TimeWindow with days='weekend' and frequency='every_other' and interval='2nd_to_last' implies that we are interested in a TimeWindow that actually recurs "every 2nd to last weekend every other month".

5) Categories

Categories are a way of organizing or tagging available Services/Activities.

6) Search Results

A specifically programmed Search graphical user interface for retrieving Services/Activities that meet search criteria such as Category name, geographic distance, rating, price, etc.

7) Bookings

In some embodiments, a Booking represents the commitment by one user to attend a Service/Activity of another user at a particular time. The API allows the creation and management of Bookings GET/Bookings This will look up all uncompleted Bookings that your account has access to—this includes all Bookings under your own User account as well as any Bookings of Users for which you are the Account Manager.

Optional Parameters:

user_id—provide a User ID to see only this User's Bookings states—provide a comma-separated list of Booking states in order to only retrieve Bookings in those states. Leave blank to retrieve all possible states.

page—result page of interest, default: 1 per_page—number of results per page, default: 10.

GET/bookings/{id}

Look up details for a Booking by ID. You can access details for any Service under your own User account as well as any Bookings of Users for which you are the Account Manager.

Required Parameters:

id—id of booking to retrieve.

POST/bookings/new

Create a new Booking Your own User account will by default be recorded as the initiator of the booking Optionally, provide a user_id for a User you are the Account Manager of in order to create a booking Required Parameters:

service_id—the ID of the Service that is to be booked date—provide the date of the requested Booking Several formats are supported: "Oct. 31, 2014", "10/31/2014", "2014-10-31"

time—provide the time of the requested Booking Several formats are supported: "9 am", "09:00", "9:00", "0900"

Optional Parameters:

resource_id—the ID of a Resource to be booked. If not provided, the first available Resource will be booked.

duration—if the service allows requesting a variable amount of time, specify how many minutes are desired user_id—ID of a User you are the Account Manager of for whom you would like to initiate a booking PUT/bookings/{id}

Update information for a Booking. The ID must be of a Booking that is under your User account or any User for which you are the Account Manager. You can not update appointment time information for a Booking once placed. This action is a placeholder for future update-able information.

DELETE/bookings/{id}

Attempt to cancel a Booking by ID. The ID must be of a Booking that is under your User account or any User for which you are the Account Manager. If cancellation is not possible, this will return an error message.

Required Parameters:

id—id of booking to cancel

Categories

GET/categories

This will look up all Categories in the system. If retrieving Categories for a particular User, you must be authorized to manage this User.

Optional Parameters:

user_id—provide a User ID to see only the Categories of Services offered by a particular User page—result page of interest, default: 1 per_page—number of results per page, default: 10

GET/categories/{id}

Look up details for a Category by ID. You can access details for any Category.

Required Parameters:

id—id of category to retrieve

POST/categories/new

Create a new Category. Please note that once created, it can not be modified. A duplicate named Category under the same Parent Category ID is not permitted.

Required Parameters:

name—name of new Category description—description for Category

Optional Parameters:

short_name—abbreviated name for Category long_name—full name of Category parent_category_id—id of parent Category PricingModels GET/pricing_models This will look up all PricingModels in the system.

Optional Parameters:

user_id—provide a User ID to see only this User's PricingModels page—result page of interest, default: 1 per_page—number of results per page, default: 10

GET/pricing_models/{id}

Look up details for a PricingModel by ID. You can access details for any PricingModel under your own User account as well as any PricingModels of Users for which you are the Account Manager.

POST/pricing_models/new

Create a new PricingModel. Your own User account will automatically become the Account Manager for any newly created PricingModels.

Required Parameters:

name—name of Pricing Model being created type—type of Pricing Model (must be a valid type, see Entities above)

Optional Parameters:

user_id—provide a User ID of a managed User to create a Pricing Model for this User price—price, if applicable currency—3-letter ISO currency code notes—additional notes about Pricing Model PUT/pricing_models/{id}

Update information for a PricingModel. The ID must be of a PricingModel that is under your User account or any User for which you are the Account Manager.

Optional Parameters:

name—new name of Pricing Model

Resources

GET/resources

This will look up all Resources that your account has access to—by default this includes all Resources under your own User account as well as any Resources of Users for which you are the Account Manager. Provide user_id of a managed User to return only the Resources for that User.

Optional Parameters:

user_id—provide a User ID to see only this User's Resources page—result page of interest, default: 1 per_page—number of results per page, default: 10

GET/resources/{id}

Look up details for a Resource by ID. You can access details for any Resource under your own User account as well as any Resources of Users for which you are the Account Manager.

POST/resources/new

Create a new Resource. By default your own User account will automatically become the Account Manager for any newly created Resources.

Required Parameters:

name—name of Pricing Model being created type—type of Pricing Model. must be a valid type, see Entities above.

Optional Parameters:

user_id—provide a User ID of a managed User to create a resource for this user gender—gender of Resource, if applicable capacity—capacity of Resource, if applicable description—description of Resource PUT/resources/{id}

Update information for a Resource. The ID must be of a Resource that is under your User account or any User for which you are the Account Manager. You can not update Resources that were previously deleted.

Optional Parameters:

name—new name of Resource

DELETE/resources/{id}

Delete a Resource by ID. The ID must be of a Resource that is under your User account or any User for which you are the Account Manager. Deletion is a multi-step process: first the Resource is marked inactive and no longer appears in Search results; if no Bookings exist for this Resource then it is completely destroyed, otherwise it is kept archived for historical purposes. You cannot delete Resources that were previously deleted.

Schedules

GET/schedules

This will look up all Schedules that your account has access to—this includes all Schedules under your own User account as well as any Schedules of Users for which you are the Account Manager.

Optional Parameters:

user_id—provide a User ID to see only this User's Schedules for their Services page—result page of interest, default: 1 per_page—number of results per page, default: 10

GET/schedules/{id}

Look up details for a Schedule by ID. You can access details for any Schedule under your own User account as well as any Schedules of Users for which you are the Account Manager.

POST/schedules/new

Create a new Schedule. A Schedule is created in the context of a Service that is provided by a Resource. Recall that a Basic User is automatically a Resource for their own Services. A Pro User has the ability to create additional Resources, in addition to their own, each one of which can provide their own set of Services with their own Schedules.

In some embodiments, to save an API call, one can pass parameters for the first TimeWindow as part of the Schedule creation (see POST params for TimeWindow). Although these parameters are described below in relation to the Schedule being created, they are used to create the first TimeWindow that will make up this Schedule.

While marked optional for Schedule creation, there is still validation performed to ensure that all necessary parameters for TimeWindow creation have been properly supplied if any are provided.

Required Parameters:

service_id—provide the Service ID that is being scheduled

Optional Parameters:

user_id—provide a User ID to create a Schedule for this User. You must be authorized to manage this User and User must own desired Service and Resource.

resource_id—provide the Resource ID that is being scheduled. If not provided and user_id is not present, the default Resource of the API user is assumed to be the Resource being scheduled. If not provided and user_id is present, the default Resource of the User is assumed to be the Resource being Scheduled.

start_date—start_date of the TimeWindow. Several formats are supported: "Oct. 31, 2014", "10/31/2014", "2014-10-31"

end_date—end date of the TimeWindow. Several formats are supported: "Oct. 31, 2014", "10/31/2014", "2014-10-31". If no end date is specified this TimeWindow is deemed "infinite".

start_time—start time of the TimeWindow. Several formats are supported: "9 am", "09:00", "9:00", "0900"

end_time—end time of the TimeWindow. Several formats are supported: "5 pm", "17:00", "1700"

total_minutes—only necessary if the length of the Service cannot be deduced from end_time minus start_time. An example would be a Service that actually lasts 36 hours from 10 am to 10 pm the next day. This must be specified in number of minutes, eg. 2160=36 hours.

days—a String list of comma-separated days of the week this window of time falls on: "sunday, monday, tuesday, wednesday, thursday, friday, saturday". At least one must be specified. The order supplied does not matter.

recurs_by—one and only one of the following possible values: [once, daily, weekly, monthly, yearly].

frequency—one of the following possible values: [single, every, every_other, every_3rd, every_4th, . . . , every_(Nth)] where Nth max is '100th'. If nothing is specified, the default value is 'every'.

occurrence—one of the following possible values: [every, 1st, 2nd, 3rd, . . . , (Nth), last, 2nd_to_last, 3rd_to_last, . . . , (Mth)_to_last] where Nth max is '366th' and Mth max is '10th'. If nothing is specified, the default value is 'every'.

date_recurs_by—this field is optional except when 'recurs_by' is one of 'monthly' or 'yearly'. For those two types of TimeWindows this field must be one of [date_in_month, day_in_month] for 'monthly' and [date_in_year, day_in_year] for 'yearly', respectively. 'day_in_month' specifies that we're interested in the day that is represented by the date in the month, for example, the "2nd Tuesday" of the month. 'day_in_year' specifies that we're interested in the day that is represented by the date in the year, for example, the "182nd" day of the year.

POST/schedules/{id}/time_windows/new

Create a TimeWindow for Schedule specified by Schedule ID. The Schedule ID must be of a Schedule that is under your User account or any User for which you are the Account Manager.

Required Parameters:

id—id of Schedule being modified start_date—start date of the TimeWindow. Various formats can be supported: "Oct. 31, 2014", "10/31/2014", "2014-10-31"

start_time—start time of the TimeWindow. Various formats can be supported: "9 am", "09:00", "9:00", "0900"

end_time—end time of the TimeWindow. Various formats can be supported: "5 pm", "17:00", "17:00", "1700"

days—a String list of comma-separated days of the week this window of time falls on: "sunday, monday, tuesday, wednesday, thursday, friday, saturday". At least one must be specified. In some embodiments, the order supplied does not matter.

recurs_by—one and only one of the following possible values: [once, daily, weekly, monthly, yearly].

Optional Parameters:

end_date—end date of the TimeWindow. Several formats are supported: "Oct. 31, 2014", "10/31/2014", "2014-10-31". If no end_date is specified this TimeWindow is deemed "infinite".

total_minutes—only necessary if the length of the Service cannot be deduced from end_time minus start_time. An example would be a Service that actually lasts 36 hours from 10 am to 10 pm the next day. This must be specified in number of minutes, eg. 2160=36 hours.

frequency—one of the following possible values: [single, every, every_other, every_3rd, every_4th, . . . , every_(Nth)] where Nth max is '100th'. If nothing is specified, the default value is 'every'.

occurrence—one of the following possible values: [every, 1st, 2nd, 3rd, . . . , (Nth), last, 2nd_to_last, 3rd_to_last, . . . , (Mth)_to_last] where Nth max is '366th' and Mth max is '10th'. If nothing is specified, the default value is 'every'.

date_recurs_by—this field is optional except when 'recurs_by' is one of 'monthly' or 'yearly'. For those two types of TimeWindows this field must be one of [date_in_month, day_in_month] for 'monthly' and [date_in_year, day_in_year] for 'yearly', respectively. 'date_in_XX' specifies that the actual date is required. 'day_in_month' specifies that we're interested in the day that is represented by the date in the month, for example, the "2nd Tuesday" of the month. 'day_in_year' specifies that we're interested in the day that is represented by the date in the year, for example, the "182nd" day of the year.

PUT/schedules/{id}/time_windows/{time_window_id}

Update information for a TimeWindow of a Schedule. The Schedule ID must be of a Schedule that is under your User account or any User for which you are the Account Manager.

Required Parameters:

id—id of Schedule being modified time_window_id—id of TimeWindow being modified

Optional Parameters:

start_date—start_date of the TimeWindow. Several formats are supported: "Oct. 31, 2014", "10/31/2014", "10-31-2014"

end_date—end date of the TimeWindow. Several formats are supported: "Oct. 31, 2014", "10/31/2014", "10-31-2014". If no end_date is specified this TimeWindow is deemed "infinite".

start_time—start time of the TimeWindow. Several formats are supported: "9 am", "09:00", "9:00", "0900"

end_time—end time of the TimeWindow. Several formats are supported: "5 pm", "17:00", "17:00", "1700"

days—a String list of comma-separated days of the week this window of time falls on: "sunday, monday, tuesday, wednesday, thursday, friday, saturday". At least one must be specified. The order supplied does not matter.

recurs_by—one and only one of the following possible values: [once, daily, weekly, monthly, yearly].

total_minutes—only necessary if the length of the Service can not be deduced from end_time minus start_time. An example would be a Service that actually lasts 36 hours from 10 am to 10 pm the next day. This must be specified in number of minutes, eg. 2160=36 hours.

frequency—one of the following possible values: [single, every, every_other, every_3rd, every_4th, . . . , every_(Nth)] where Nth max is '100th'. If nothing is specified, the default value is 'every'.

occurrence—one of the following possible values: [every, 1st, 2nd, 3rd, . . . , (Nth), last, 2nd_to_last, 3rd_to_last, . . . , (Mth)_to_last] where Nth max is '366th' and Mth max is '10th'. If nothing is specified, the default value is 'every'.

date_recurs_by—this field is optional except when 'recurs_by' is one of 'monthly' or 'yearly'. For those two types of TimeWindows this field must be one of [date_in_month, day_in_month] for 'monthly' and [date_in_year, day_in_year] for 'yearly', respectively. 'date_in_XX' specifies that the actual date is required. 'day_in_month' specifies that we're interested in the day that is represented by the date in the month, for example, the "2nd Tuesday" of the month. 'day_in_year' specifies that we're interested in the day that is represented by the date in the year, for example, the "182nd" day of the year.

DELETE/schedules/{id}/time_windows/{time_window_id}

Delete a TimeWindow of a Schedule. The Schedule ID must be of a Schedule that is under your User account or any User for which you are the Account Manager.

Required Parameters:

id—id of Schedule being modified time_window_id—id of TimeWindow being modified

DELETE/schedules/{id}

Delete a Schedule by ID. The ID must be of a Schedule that is under your User account or any User for which you are the Account Manager. Deletion is a multi-step process: first the Schedule is marked inactive and no longer appears in Search results; if no Bookings exist for this Schedule then it is completely destroyed, otherwise it is kept archived for historical purposes. You cannot delete Schedules that were previously deleted.

Required Parameters:

id—id of Schedule being modified

Search

GET/search/{query}

All Service/Activites that match given search criteria will be returned.

Required Parameters:

query—search query

Optional Parameters:

page—result page of interest, default: 1 per_page—number of results per page, default: 10

Services

GET/services

This will look up all Services that your account has access to—this includes all Services under your own User account as well as any Services of Users for which you are the Account Manager.

Optional Parameters:

user_id—provide a User ID to see only this User's Services page—result page of interest, default: 1 per_page—number of results per page, default: 10

GET/services/{id}

Look up details for a Service by ID. You can access details for any Service under your own User account as well as any Services of Users for which you are the Account Manager.

GET/services/{id}/available slots

Look up available time slots for a Service by ID. You can query for a specific date or for a date range. The returned result set will group available slots by Resources that are offering the Service. You can access details for any Service under your own User account as well as any Services of Users for which you are the Account Manager.

Required Parameters:

id—ID of desired Service

Optional Parameters:

date—a specific date to check for availability. Either this field or a date range employing start_date and end_date must be supplied. If date is provided, start_date/end_date are ignored. Several formats are supported: "2014-10-31", "Oct. 31, 2014".

start_date—start_date of a date range to check for availability. If supplied, date must not be supplied and end_date must be supplied. Several formats are supported: "2014-10-31", "Oct. 31, 2014".

end_date—end_date of a date range to check for availability. If supplied, date must not be supplied and start_date must be supplied. Several formats are supported: "2014-10-31", "Oct. 31, 2014".

POST/services/new

Create a new Service. Unless a user_id is provided, your own User account will automatically become the Account Manager for any newly created services.

Required Parameters:

name—name of the Service description—a description for the Service duration—minimum number of minutes required to perform this Service Optional Parameters:

user_id—provide a User ID to create a Service for this User. You must be authorized to manage this User.

short_name—an abbreviated name for the Service, used where space is limited price_model_id—ID of a PricingModel for this service, that your account has permission to use resources—a string of Resource IDs, comma-separated; if user_id is provided, all Resources must be owned by the User, defaults to User's Resource ID; if user_id is not provided, all Resources must be owned by API User; defaults to API User's Resource ID categories—a string of Category IDs, comma-separated PUT/services/{id}

Update information for a Service. The ID must be of a Service that is under your User account or any User for which you are the Account Manager. You can not update Services that were previously deleted.

Required Parameters:

id—ID of desired Service to modify

Optional Parameters:

name—name of the Service description—a description for the Service duration—minimum number of minutes required to perform this Service short_name—an abbreviated name for the Service, used where space is limited price_model_id—ID of a PricingModel for this Service resources—a string of Resource IDs, comma-separated; all resources must be owned by the same user; defaults to API User's Resource ID categories—a string of Category IDs, comma-separated DELETE/services/{id}

Delete a Service by ID. The ID must be of a Service that is under your User account or any User for which you are the Account Manager. Deletion is a multi-step process: first the Service is marked inactive and no longer appears in Search results; if no Bookings exist for this Service then it is completely destroyed, otherwise it is kept archived for historical purposes. You cannot delete Services that were previously deleted.

Users

GET/users

This will look up all Users that your account has access to—this includes your own User account as well as any Users for which you are the Account Manager.

Optional Parameters:

page—result page of interest, default: 1 per_page—number of results per page, default: 10

GET/users/{id}

Look up details for a User by ID. You can access details for your own User account as well as any Users for which you are the Account Manager.

POST/users/new

Create a new User. Your own User account will automatically become the Account Manager for any newly created Users.

PUT/users/{id}

Update information for a User. The ID can be your own User account or the ID of any User of which you are the Account Manager. If the specified User has a password on file, changing the User's email address will invalidate the password and send a Reset Password email to the User.

PUT/users/{id}/register_pro

Upgrade a User by ID from a Basic to a Pro user.

GET/users/{id}/request_password

This will send a Reset Password email to the specified User's email address containing a link where they can reset their password. This will return all Users that are currently Pro Users, for which you are the Account Manager, including your own account.

GET/users/pros

This will return all Users that are currently Pro Users, for which you are the Account Manager, including your own account.

In some embodiments, the present invention provides for a computer-implemented method, including at least the steps of: electronically causing, via a computer network, by at least one specifically programmed computer processor of a schedule management computer system executing software to perform the method, to display a first specialized schedule graphical user interface (a first specialized schedule GUI) on a screen of each computing device associated with each user of a plurality of users; where the first specialized schedule GUI is configured to allow each user to: i) define at least one programmed schedule object, including a plurality of availability time periods (a plurality of TimeWindows), and ii)

associate at least one programmed schedule object with at least one of: 1) at least one user, 2) at least one resource, and 3) at least one service; where each TimeWindow is: i) defined by a plurality of TimeWindow parameters, and ii) configured to identify whether a corresponding time period is available for booking or unavailable for booking; where the plurality of TimeWindow parameters include: i) at least one first TimeWindow parameter, identifying a start date for the corresponding time period, ii) at least one second TimeWindow parameter, identifying a start time for the corresponding time period, iii) at least one third TimeWindow parameter, identifying an end time for the corresponding time period, iv) at least one fourth TimeWindow parameter, identifying at least one day of a week associated with the corresponding time period, and v) at least one fifth TimeWindow parameter, identifying a period type of the corresponding time period; electronically and in real-time, generating, by the at least one specifically programmed computer processor, based, at least in part, on the at least one fourth TimeWindow parameter, a first bitmask of days in a week for the corresponding time period of each TimeWindow of the plurality of TimeWindows; electronically and in real-time, storing, by the at least one specifically programmed computer processor, a plurality of schedule objects associated with the plurality of users in at least one specifically dedicated database;

electronically causing, via the computer network, by the at least one specifically programmed computer processor, to display a second specialized schedule graphical user interface (a second specialized schedule GUI) on a screen of a computing device associated with a particular user, where the second specialized schedule GUI is configured to allow each user to submit an electronic query seeking to determine when a particular time period associated with at least one user is available for booking or unavailable for booking; electronically receiving, via the computer network, by the at least one specifically programmed computer processor, the electronic query of the particular user; electronically and in real-time, determining, by the at least one specifically programmed computer processor, based on the electronic query of the particular user, a set of TimeWindows selected from the plurality of schedule objects related to at least one of 1) the at least one user, 2) the at least one resource, and 3) the at least one service; electronically and in real-time, determining, by the at least one specifically programmed computer processor, based on the electronic query of the particular user, a set of TimeWindows selected from the plurality of schedule objects related to at least one of 1) the at least one user, 2) the at least one resource, and 3) the at least one service; electronically and in real-time, generating, by the at least one specifically programmed computer processor, a union structure of the set of TimeWindows; electronically and in real-time, determining, by the at least one specifically programmed computer processor, based on the first bitmask associated with each TimeWindow of the set of TimeWindows, a second bitmask corresponding to the at least one union; electronically and in real-time, determining, by the at least one specifically programmed computer processor, an intersection structure between the union and the electronic query of the particular user to identify at least one matched day of the week between the at least one union and the particular time period identified in the electronic query of the particular user; electronically and in real-time, determining, by the at least one specifically programmed computer processor, when the at least one matched day of the week includes the particular time period identified in the electronic query of the particular user, based, at least in part, on: 1) the at least one second TimeWindow parameter of a particular TimeWindow associated with the at least one matched day of the week; 2) the at least one third TimeWindow parameter of the particular TimeWindow associated with the at least one matched day of the week; 3) the at least one second TimeWindow parameter of the particular time period identified in the electronic query of the particular user; and 4) the at least one third TimeWindow parameter of the particular time period identified in the electronic query of the particular user; and electronically and in real-time, performing, by the at least one specifically programmed computer processor, one of: i) booking the particular time period for the particular user when the at least one matched day of the week includes the particular time period identified in the electronic query of the particular user; and ii) generating an indication identifying that the particular time period is unavailable for booking when the at least one matched day of the week excludes the particular time period identified in the electronic query of the particular user. In some embodiments, the exemplary method of the present invention further includes at least: electronically and in real-time, storing, by the at least one specifically programmed computer processor, the union structure and the intersection structure in the at least one specifically dedicated database.

In some embodiments, the plurality of parameters further include at least one sixth parameter, identifying an end date for the corresponding time period. In some embodiments, the period type of the corresponding time period is selected from the group consisting of: once, daily, weekly, monthly, quarterly, and yearly. In some embodiments, the plurality of parameters further include at least one seventh parameter, identifying a particular date or a particular day which is within the corresponding time period having the period type of monthly or yearly. In some embodiments, the plurality of parameters further include at least one eighth parameter, identifying a frequency of the corresponding time period. In some embodiments, the plurality of parameters further include at least one ninth parameter, identifying an interval for the frequency of the corresponding time period. In some embodiments, the union structure is based on a logical OR operation with the set of TimeWindows. In some embodiments, the intersection structure is based on a logical AND operation.

In some embodiments, the present invention provides for a specifically programmed schedule management computer system, including at least: at least one specialized computer machine, including: a non-transient memory, electronically storing particular computer executable program code; and at least one computer processor which, when executing the particular program code, becomes a specifically programmed computer processor of the specifically programmed schedule management computer system that is configured to concurrently perform at least the following operations: electronically causing, via a computer network, to display a first specialized schedule graphical user interface (a first specialized schedule GUI) on a screen of each computing device associated with each user of a plurality of users; where the first specialized schedule GUI is configured to allow each user to: i) define at least one programmed schedule object, including a plurality of availability time periods (a plurality of TimeWindows), and ii) associate at least one programmed schedule object with at least one of: 1) at least one user, 2) at least one resource, and 3) at least one service; where each TimeWindow is: i) defined by a plurality of TimeWindow parameters, and ii) configured to identify whether a corresponding time period is available for booking or unavailable for booking; where the plurality of TimeWindow parameters include: i) at least one first TimeWindow parameter, identifying a start date for the corresponding time period, ii) at least one second TimeWindow parameter, identifying a start time for the corresponding time period, iii) at least one third TimeWindow parameter, identifying an end time for the corresponding time period, iv) at least one fourth TimeWindow parameter, identifying at least one day of a week associated with the corresponding time period, and v) at least one fifth TimeWindow parameter, identifying a period type of the corresponding time period; electronically and in real-time, generating, based, at least in part, on the at least one fourth TimeWindow parameter, a first bitmask of days in a week for the corresponding time period of each TimeWindow of the plurality of TimeWindows; electronically and in real-time, storing a plurality of schedule objects associated with the plurality of users in at least one specifically dedicated database; electronically causing, via the computer network, to display a second specialized schedule graphical user interface (a second specialized schedule GUI) on a screen of a computing device associated with a particular user, where the second specialized schedule GUI is configured to allow each user to submit an electronic query seeking to determine when a particular time period associated with at least one user is available for booking or unavailable for booking; electronically receiving, via the computer network, the electronic query of the particular user; electronically and in real-time, determining, based on the electronic query of the particular user, a set of TimeWindows selected from the plurality of schedule objects related to at least one of 1) the at least one user, 2) the at least one resource, and 3) the at least one service; electronically and in real-time, determining, based on the electronic query of the particular user, a set of TimeWindows selected from the plurality of schedule objects related to at least one of 1) the at least one user, 2) the at least one resource, and 3) the at least one service; electronically and in real-time, generating a union structure of the set of TimeWindows; electronically and in real-time, determining, based on the first bitmask associated with each TimeWindow of the set of TimeWindows, a second bitmask corresponding to the at least one union; electronically and in real-time, determining an intersection structure between the union and the electronic query of the particular user to identify at least one matched day of the week between the at least one union and the particular time period identified in the electronic query of the particular user; electronically and in real-time, determining when the at least one matched day of the week includes the particular time period identified in the electronic query of the particular user, based, at least in part, on: 1) the at least one second TimeWindow parameter of a particular TimeWindow associated with the at least one matched day of the week; 2) the at least one third TimeWindow parameter of the particular TimeWindow associated with the at least one matched day of the week; 3) the at least one second TimeWindow parameter of the particular time period identified in the electronic query of the particular user; and 4) the at least one third TimeWindow parameter of the particular time period identified in the electronic query of the particular user; and electronically and in real-time, performing one of: i) booking the particular time period for the particular user when the at least one matched day of the week includes the particular time period identified in the electronic query of the particular user; and ii) generating an indication identifying that the particular time period is unavailable for booking when the at least one matched day of the week excludes the particular time period identified in the electronic query of the particular user.

As generally illustrated herein, the system embodiments can incorporate a variety of computer readable media that comprise computer usable medium having computer readable code means embodied therein. One skilled in the art will recognize that the software associated with the various processes described can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

The method and system of the present invention have been described above and in the attached drawings; however, modifications will be apparent to those of ordinary skill in the art and the scope of protection for the invention is to be defined by the claims that follow.

What is claimed is:

1. A computer-implemented method, comprising:
electronically causing, via a computer network, by at least one specifically programmed computer processor of a schedule management computer system executing software to perform the method, to display a first specialized schedule graphical user interface (a first specialized schedule GUI) on a screen of each remotely distributed computing device associated with each user of a plurality of users;
wherein the plurality of users are associated with a plurality of remotely distributed computing devices;
wherein the first specialized schedule GUI is configured to allow each user to:
  i) define at least one programmed software schedule object, comprising a plurality of availability time periods (a plurality of TimeWindows), and
  ii) associate at least one programmed software schedule object with at least one of:
    1) at least one user,
    2) at least one resource, and
    3) at least one service;
wherein each TimeWindow is:
  i) defined by a plurality of TimeWindow parameters, and
  ii) configured to identify whether a corresponding time period is available for booking or unavailable for booking;
wherein the plurality of TimeWindow parameters comprise:
  i) at least one first TimeWindow parameter, identifying a start date for the corresponding time period,
  ii) at least one second TimeWindow parameter, identifying a start time for the corresponding time period,
  iii) at least one third TimeWindow parameter, identifying an end time for the corresponding time period,
  iv) at least one fourth TimeWindow parameter, identifying at least one day of a week associated with the corresponding time period, and
  v) at least one fifth TimeWindow parameter, identifying a period type of the corresponding time period;
executing, in real-time, by the at least one specifically programmed computer processor, a programmed software scheduling module which at least perform the following operations:
electronically and in real-time, generating, based, at least in part, on the at least one fourth TimeWindow parameter, at least one first bitmask data object of days in a week for the corresponding time period of each TimeWindow of the plurality of TimeWindows so as to generate a plurality of first bitmask data objects for the plurality of TimeWindows, wherein the plurality of first bitmask data objects associated with the at least one programmed software schedule object;

electronically and in real-time, storing a plurality of programmed software schedule objects associated with the plurality of users in at least one specifically dedicated database, wherein each programmed software schedule object comprises the plurality of first bitmask data objects;

electronically causing, via the computer network, to display a second specialized schedule graphical user interface (a second specialized schedule GUI) on a screen of a remotely distributed computing device associated with a particular user, wherein the second specialized schedule GUI is configured to allow each user to submit an electronic query seeking to determine when a particular time period is available for booking or unavailable for booking, wherein the particular time period associated with at least one of:
1) the at least one user,
2) the at least one resource, and
3) the at least one service;

electronically receiving, via the computer network, the electronic query of the particular user;

electronically and in real-time, determining, based on the electronic query of the particular user, a set of TimeWindows selected from the plurality of programmed software schedule objects related to at least one of 1) the at least one user, 2) the at least one resource, and 3) the at least one service;

electronically and in real-time, generating a union data structure of the set of TimeWindows, wherein the union data structure comprises at least one union data representation;

electronically and in real-time, determining, based on each first bitmask data object of the plurality of first bitmask data objects associated with the set of TimeWindows, a second bitmask corresponding to the at least one union data representation;

electronically and in real-time, determining an intersection data structure between the union data structure and the electronic query of the particular user to electronically identify at least one matched day of the week between the at least one union data representation and the particular time period identified in the electronic query of the particular user;

electronically and in real-time, determining when the at least one matched day of the week includes the particular time period identified in the electronic query of the particular user, based, at least in part, on:
1) the at least one second TimeWindow parameter of a particular TimeWindow associated with the at least one matched day of the week;
2) the at least one third TimeWindow parameter of the particular TimeWindow associated with the at least one matched day of the week;
3) the at least one second TimeWindow parameter of the particular time period identified in the electronic query of the particular user; and
4) the at least one third TimeWindow parameter of the particular time period identified in the electronic query of the particular user; and electronically and in real-time causing at least one of:
i) booking, by a respective remotely distributed computing device, the particular time period for the particular user when the at least one matched day of the week includes the particular time period identified in the electronic query of the particular user, wherein the respective remotely distributed computing device is associated with at least one of 1) the at least one user, 2) the at least one resource, and 3) the at least one service; and
ii) generating an electronic scheduling alert on the screen of remotely distributed computing device associated with a particular user, wherein the electronic scheduling alert identifies that the particular time period is unavailable for booking when the at least one matched day of the week excludes the particular time period identified in the electronic query of the particular user.

2. The method of claim 1, further comprising:
electronically and in real-time, storing, by the at least one specifically programmed computer processor, the union data structure and the intersection data structure in the at least one specifically dedicated database.

3. The method of claim 1, wherein the plurality of parameters further comprise at least one sixth parameter, identifying an end date for the corresponding time period.

4. The method of claim 1, wherein the period type of the corresponding time period is selected from the group consisting of: once, daily, weekly, monthly, quarterly, and yearly.

5. The method of claim 4, wherein the plurality of parameters further comprise at least one seventh parameter, identifying a particular date or a particular day which is within the corresponding time period having the period type of monthly or yearly.

6. The method of claim 1, wherein the plurality of parameters further comprise at least one eighth parameter, identifying a frequency of the corresponding time period.

7. The method of claim 6, wherein the plurality of parameters further comprise at least one ninth parameter, identifying an interval for the frequency of the corresponding time period.

8. The method of claim 1, wherein the union data structure is based on a logical OR operation with the set of TimeWindows.

9. The method of claim 1, wherein the intersection data structure is based on a logical AND operation.

10. A specifically programmed schedule management computer system, comprising:
at least one specialized computer machine, comprising:
a non-transient memory, electronically storing particular computer executable program code; and
at least one computer processor which, when executing the particular program code, becomes a specifically programmed computer processor of the specifically programmed schedule management computer system that is configured to concurrently perform at least the following operations:
electronically causing, via a computer network, to display a first specialized schedule graphical user interface (a first specialized schedule GUI) on a screen of each remotely distributed computing device associated with each user of a plurality of users;
wherein the plurality of users are associated with a plurality of remotely distributed computing devices;

wherein the first specialized schedule GUI is configured to allow each user to:
  i) define at least one programmed software schedule object, comprising a plurality of availability time periods (a plurality of TimeWindows), and
  ii) associate at least one programmed software schedule object with at least one of:
    1) at least one user,
    2) at least one resource, and
    3) at least one service;
wherein each TimeWindow is:
  i) defined by a plurality of TimeWindow parameters, and
  ii) configured to identify whether a corresponding time period is available for booking or unavailable for booking;
wherein the plurality of TimeWindow parameters comprise:
  i) at least one first TimeWindow parameter, identifying a start date for the corresponding time period,
  ii) at least one second TimeWindow parameter, identifying a start time for the corresponding time period,
  iii) at least one third TimeWindow parameter, identifying an end time for the corresponding time period,
  iv) at least one fourth TimeWindow parameter, identifying at least one day of a week associated with the corresponding time period, and
  v) at least one fifth TimeWindow parameter, identifying a period type of the corresponding time period;
executing, in real-time, a programmed software scheduling module which at least perform the following operations:
electronically and in real-time, generating, based, at least in part, on the at least one fourth TimeWindow parameter, at least one first bitmask data object of days in a week for the corresponding time period of each TimeWindow of the plurality of TimeWindows so as to generate a plurality of first bitmask data objects for the plurality of TimeWindows, wherein the plurality of first bitmask data objects associated with the at least one programmed software schedule object;
electronically and in real-time, storing a plurality of programmed software schedule objects associated with the plurality of users in at least one specifically dedicated database, wherein each programmed software schedule object comprises the plurality of first bitmask data objects;
electronically causing, via the computer network, to display a second specialized schedule graphical user interface (a second specialized schedule GUI) on a screen of a remotely distributed computing device associated with a particular user, wherein the second specialized schedule GUI is configured to allow each user to submit an electronic query seeking to determine when a particular time period is available for booking or unavailable for booking, wherein the particular time period associated with at least one of:
  1) the at least one user,
  2) at least one resource, and
  3) the at least one service;
electronically receiving, via the computer network, the electronic query of the particular user;
electronically and in real-time, determining, based on the electronic query of the particular user, a set of TimeWindows selected from the plurality of programmed software schedule objects related to at least one of 1) the at least one user, 2) the at least one resource, and 3) the at least one service;
electronically and in real-time, generating a union data structure of the set of TimeWindows, wherein the union data structure comprises at least one union data representation;
electronically and in real-time, determining, based on each first bitmask data object of the plurality of first bitmask data objects associated with the set of TimeWindows, a second bitmask corresponding to the at least one union data representation;
electronically and in real-time, determining an intersection data structure between the union data structure and the electronic query of the particular user to electronically identify at least one matched day of the week between the at least one union data representation and the particular time period identified in the electronic query of the particular user;
electronically and in real-time, determining when the at least one matched day of the week includes the particular time period identified in the electronic query of the particular user, based, at least in part, on:
  1) the at least one second TimeWindow parameter of a particular TimeWindow associated with the at least one matched day of the week;
  2) the at least one third TimeWindow parameter of the particular TimeWindow associated with the at least one matched day of the week;
  3) the at least one second TimeWindow parameter of the particular time period identified in the electronic query of the particular user; and
  4) the at least one third TimeWindow parameter of the particular time period identified in the electronic query of the particular user; and
electronically and in real-time causing at least one of:
  i) booking, by a respective remotely distributed computing device, the particular time period for the particular user when the at least one matched day of the week includes the particular time period identified in the electronic query of the particular user, wherein the respective remotely distributed computing device is associated with at least one of 1) the at least one user, 2) the at least one resource, and 3) the at least one service; and
  ii) generating an electronic scheduling alert on the screen of remotely distributed computing device associated with a particular user, wherein the electronic scheduling alert identifies that the particular time period is unavailable for booking when the at least one matched day of the week excludes the particular time period identified in the electronic query of the particular user.

11. The system of claim 10, wherein the specifically programmed computer processor of the specifically programmed schedule management computer system is further configured to perform at least:
electronically and in real-time, storing the union data structure and the intersection data structure in the at least one specifically dedicated database.

12. The system of claim 10, wherein the plurality of parameters further comprise at least one sixth parameter, identifying an end date for the corresponding time period.

13. The system of claim 10, wherein the period type of the corresponding time period is selected from the group consisting of: once, daily, weekly, monthly, quarterly, and yearly.

14. The system of claim 13, wherein the plurality of parameters further comprise at least one seventh parameter, identifying a particular date or a particular day which is within the corresponding time period having the period type of monthly or yearly.

15. The system of claim 10, wherein the plurality of parameters further comprise at least one eighth parameter, identifying a frequency of the corresponding time period.

16. The system of claim 15, wherein the plurality of parameters further comprise at least one ninth parameter, identifying an interval for the frequency of the corresponding time period.

17. The system of claim 10, wherein the union data structure is based on a logical OR operation with the set of TimeWindows.

18. The system of claim 10, wherein the intersection structure is based on a logical AND operation.

* * * * *